United States Patent [19]

Hirai et al.

[11] Patent Number: 4,740,445

[45] Date of Patent: Apr. 26, 1988

[54] IMAGE FORMING PROCESS

[75] Inventors: Hiroyuki Hirai; Yoshiharu Yabuki; Kozo Sato, all of Kanagawa, Japan

[73] Assignee: Fuji Photo Film Co., Ltd., Kanagawa, Japan

[21] Appl. No.: 890,442

[22] Filed: Jul. 30, 1986

[30] Foreign Application Priority Data

Jul. 31, 1985 [JP] Japan ................................. 60-169585

[51] Int. Cl.$^4$ ........................... G03C 5/54; G03C 1/06
[52] U.S. Cl. ..................................... 430/203; 430/17; 430/351; 430/353; 430/619; 430/955; 430/617
[58] Field of Search ................. 430/353, 17, 619, 955, 430/203, 351, 617

[56] References Cited

U.S. PATENT DOCUMENTS

| | | | |
|---|---|---|---|
| 3,260,598 | 7/1966 | Yutzy et al. | 430/206 |
| 4,514,493 | 4/1985 | Hirai et al. | 430/353 |
| 4,657,848 | 4/1987 | Sato et al. | 430/617 |

*Primary Examiner*—Paul R. Michl
*Assistant Examiner*—Patrick A. Doody
*Attorney, Agent, or Firm*—Sughrue, Mion, Zinn, Macpeak & Seas

[57] ABSTRACT

A color image is formed in an image forming reaction system comprising a photographic heat-developable silver halide light-sensitive material by reacting a difficultly soluble metal compound, for example, calcium carbonate with a compound capable of water-mediated complexing reaction with the metal ion of the difficultly soluble metal compound and having an organic base, for example, guanidine oxalate in the presence of water to increase the pH of the system.

15 Claims, No Drawings

IMAGE FORMING PROCESS

BACKGROUND OF THE INVENTION

This invention relates to an image forming process, and more particularly, to a process for forming dye images by heating in an alkaline atmosphere.

Photographic processes using silver halides have been most widely used because of their improved photographic properties of sensitivity and gradation control over other photographic processes including electrophotography and diazo process. Recently developed was an advanced technique which can more conveniently and rapidly produce images by substituting a dry treatment by heating or other means for a conventional wet treatment using developing solution in processes for forming images in a photosensitive material based on silver halide.

Heat developable photosensitive materials and heat development process are well known in the art and described in the literature, inter alia, "Fundamentals of Photographic Engineering —Non-Silver Photography—", Corona Publishing K.K., Tokyo, Japan (1982), pages 242–255; "Image Information", April 1978, page 40; Nebletts Handbook of Photography and Reprography, 7th ed., Van Nostrand Reinhold Company, pages 32–33; U.S. Pat. Nos. 3,152,904, 3,301,678, 3,392,020, and 3,457,075; British Patent Nos. 1,131,108 and 1,167,777; and Research Disclosure, June 1978, pages 9–15 (RD-17029).

A number of methods have been proposed for producing color images through heat development. Among others, U.S. Pat. Nos. 3,531,286; 3,761,270; and 4,021,240; Belgian Patent No. 802,519; and Research Disclosure, September 1975, pages 31–32, disclose a process for forming a color image through coupling of an oxidant of a developing agent with a coupler, and a variety of developing agents used therein. Research Disclosure, May 1978, pages 54–58, RD-16966 describes a process of forming an image by incorporating a nitrogen-containing heterocyclic group into a dye to form a silver salt and effecting heat development to release the dye.

A process for forming a positive color image by heat-sensitive silver dye bleaching process is also well known. Useful dye bleaching processes are disclosed in, for example, *Research Disclosure*, April 1976, pages 30–32, RD- 14433; ibid, December 1976, pages 14–15, RD-15227; and U.S. Pat. No. 4,235,957.

A process for forming a color image using a leuco dye is described in, for example, U.S. Pat. Nos. 3,985,565 and 4,022,617.

These color image forming processes, however, have the drawback that during an extended period of storage, discoloration of color images formed and coloration of white areas occur under the action of coexisting silver halide, silver complex, developing agent and the like. New color image forming processes by heat development which are substantially free of such drawbacks are described in the following Japanese Patent Application Kokai Nos.

| | | |
|---|---|---|
| 57-179840, | 57-186774, | 57-198458, |
| 57-207250, | 58-58543, | 58-79247, |
| 58-116537, | 58-149046, | 59-48764, |
| 59-65839, | 59-71046, | 59-87450, |
| 59-88730. | | |

These processes are designed such that a mobile dye is formed or released in proportion or counter-proportion to the reduction of photosensitive silver halide into silver by heat development, and the resultant mobile dye is transferred to a dye-fixing element.

In general, photosensitive materials are preferably developed with the pH of their reaction system maintained high. Incorporating highly alkaline compounds in photosensitive materials gives rise to storage inconvenience. Incorporating such alkaline compounds in image-receiving materials also leads to the accelerated hydrolysis of gelatin and other problems. In a system wherein water is supplied from the outside during transfer or development step, a pH changing compound may be added to the water although there arise problems of storage and handling.

U.S. Pat. No. 3,260,598 discloses an image forming process utilizing the mechanism wherein alkali-releasing agents, a very slightly water-soluble metal hydroxide $Z(OH)_n$ and a compound XY are reacted to release hydroxyl ions to increase the pH wherein Z represents a metal atom, X represents a sodium or potassium atom, Y represents a citrate radical, an oxalate radical, a fluorine atom, a ferricyanide radical, a tartrate radical, a sulfite radical, an ethylenedinitrilo tetraacetate radical, a 1,3-diamino-2-propanol tetraacetate radical, a trimethylamine triacetate radical, and other aliphatic nitrogenous polycarboxylate radicals, and n is 2, 3, or 4. This process, however, does not provide fully satisfactory image density. There is a need for further improvement.

SUMMARY OF THE INVENTION

It is an object of the present invention to provide a novel and improved process capable of forming high density, low fogging, long lasting images in a convenient manner.

According to the present invention, there is provided a process for forming an image in an image forming reaction system comprising a difficultly soluble metal compound and a compound capable of water-mediated complexing reaction with the metal component in ionic form of the difcultly soluble metal compound and having an organic base, wherein the two compounds are reacted in the presence of water to increase the pH of the system. Preferably, the system further comprises a photographic heat-developable silver halide light-sensitive material.

DETAILED DESCRIPTION OF THE INVENTION

According to the image forming process of the present invention, (1) a difficultly soluble metal compound and (2) a compound capable of water-mediated complexing reaction with the metal component in ionic form of said difficultly soluble metal compound and having an organic base (to be referred to as complexing compound, hereinafter) are contained in an image forming reaction system. These two compounds are reacted in the presence of water to increase the pH of the system.

The image forming reaction system as used herein means a region where image forming reaction takes place. For example, it may be a layer on a support of a light-sensitive material or any layers belonging to light-sensitive and image-receiving elements in case both the elements are present in a photographic element. In case more than one layer is present, the system may be either one layer or all layers.

In the image forming reaction system of the present invention, water is used as a reaction medium. Water may be available by any suitable means, for example, by supplying water from without the system, or by previously incorporating water-containing capsules or similar means in the system and breaking the capsules by heating or the like to release water.

Illustrative examples of the difficultly soluble metal compounds used in the practice of the present invention include carbonate salts, phosphate salts, silicate salts, borate salts, aluminate salts, hydroxides, oxides, and double salts thereof such as basic salts, provided that they have a solubility in water at 20° C. of 0.5 or less (expressed in grams of the compound dissolved in 100 grams of water). They preferably conform to the formula:

$$T_m X_n$$

wherein T represents a transition metal such as Zn, Ni, Co, Fe, Mn, etc. or an alkaline earth metal such as Ca, Mg, Ba, etc.; X represents a member that can form a counter ion of M as will be later described in connection with the complexing compounds and exhibits alkaline nature, for example, a carbonate ion, phosphate ion, silicate ion, borate ion, aluminate ion, hydroxyl ion, or oxygen atom; and m and n are integers such that the valences of T and X may maintain equilibrium.

Some preferred, non-limiting examples of the difficultly soluble metal compounds include calcium carbonate, barium carbonate, magnesium carbonate, zinc carbonate, strontium carbonate, magnesium calcium carbonate $CaMg(CO_3)_2$; magnesium oxide, zinc oxide, tin oxide, cobalt oxide, aluminum oxide; zinc hydroxide, aluminum hydroxide, magnesium hydroxide, calcium hydroxide, antimony hydroxide, tin hydroxide, iron hydroxide, bismuth hydroxide, manganese hydroxide, cadmium hydroxide, lead hydroxide, titanium hydroxide; calcium phosphate, magnesium phosphate; magnesium borate; calcium silicate, magnesium silicate; zinc aluminate, calcium aluminate; basic zinc carbonate $2ZnCO_3 \cdot 3Zn(OH)_2 \cdot H_2O$, basic magnesium carbonate $3MgCO_3 \cdot Mg(OH)_2 \cdot 3H_2O$, basic nickel carbonate $NiCO_3 \cdot 2Ni(OH)_2$, basic bismuth carbonate $Bi_2(CO_3)O_2 \cdot H_2O$, basic cobalt carbonate $2CoCO_3 \cdot 3Co(OH)_2$, and aluminum magnesium oxide. Most preferred among them are uncolored compounds.

The complexing compounds used in the present invention have an organic base and are capable of forming a complex with the metal component in ionic form of the difficultly soluble metal compounds, the complex exhibiting a stability constant of at least 1 as expressed in logK.

These complexing compounds are detailed in A. E. Martell & R. M. Smith, 'Critical Stability Constants, Vols. 1–5, Plenum Press, inter alia.

Illustrative examples of the complexing compounds include salts of organic bases with aminocarboxylic acid analogs, iminodiacetic acid analogs, anilinecarboxylic acid analogs, pyridinecarboxylic acid analogs, aminophosphoric acid analogs, carboxylic acid analogs (including mono-, di-, tri-, and tetracarboxylic acids, and their derivatives having a substituent such as phosphono, hydroxy, oxo, ester, amide, alkoxy, mercapto, alkylthio, and phosphino), hydroxamic acid analogs, polyacrylic acid analogs, and polyphosphoric acid analogs.

Preferred, non-limiting examples of the complexing compounds are salts of organic bases with picolinic acid, 2,6-pyridinedicarboxylic acid, 2,5-pyridinedicarboxylic acid, 4-dimethylaminopyridine-2,6-dicarboxylic acid, 5-ethylpyridine-2-carboxylic acid, quinoline-2-carboxylic acid, 2-pyridylacetic acid, oxalic acid, citric acid, tartaric acid, isocitric acid, malic acid, gluconic acid, EDTA (ethylenediaminetetraacetic acid), NTA (nitrilotriacetic acid), CDTA (1,2-cyclohexanediaminetetraacetic acid), DPTA-OH (1,3-diaminopropan-2-ol tetraacetic acid), hexametaphosphoric acid, tripolyphosphoric acid, tetraphosphoric acid, polyacrylic acid, o-aminobenzoic acid, and the compounds of the following chemical formulae:

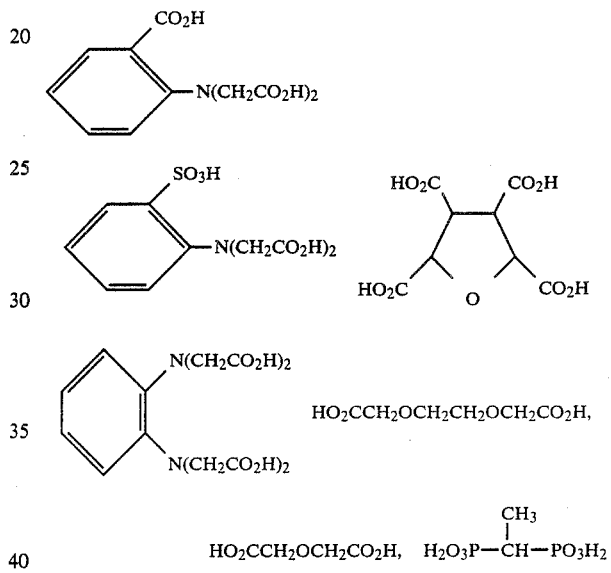

Preferred among others are those aromatic heterocyclic compounds having at least one —COOHM and containing one nitrogen atom in their ring wherein M is an organic base. The ring contained therein may be a single ring or a fused ring such as a pyridine ring and a quinoline ring. The position at which —COOHM is attached to the ring is most preferably the α-position of the ring relative to the N atom.

Also included in the preferred compounds are those represented by the following formula:

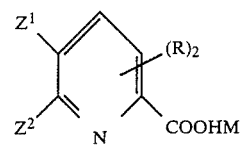

In the above formula, R represents an electron donative radical selected from hydrogen atom, aryl radicals, halogen atoms, alkoxy radicals, —COOM, hydroxycarbonyl radical, amino and substituted amino radicals, and alkyl radicals. The two R's may be the same or different. $Z^1$ and $Z^2$ are as defined for R and may be combined together to form a ring fused to the pyridine ring. M is an organic base.

The organic bases represented by M are preferably those bases containing up to 12 carbon atoms and having a pKa value of at least 7, more preferably low volatile bases having a pKa value of at least 10 and a boiling point of at least 150° C., and most preferably such bases as guanidines, cyclic guanidines, amidines, cyclic amidines, and tetraalkyl ammonium hydroxides. Preferred, non-limiting examples are piperidine, piperazine, ethylenediamine, N,N'-dimethylethylenediamine, acetamidine, diazabicyclononene, diazabicycloudecene, tetramethyl ammonium hydroxide, tetraethyl ammonium hydroxide, and the compounds of the following structural formulae:

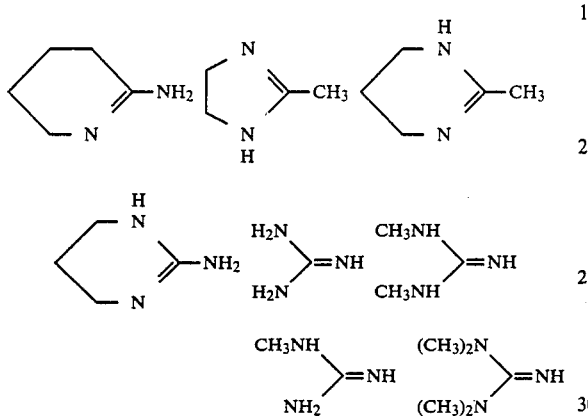

Examples of the most preferred combinations of the difficultly soluble metal compounds and the complexing compounds are illustrated below.

Calcium carbonate

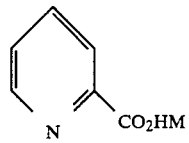

Basic zinc carbonate

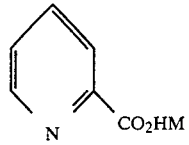

Basic magnesium carbonate

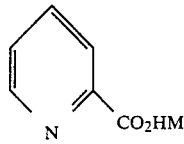

Zinc oxide

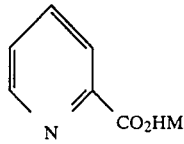

Zinc hydroxide

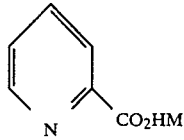

Aluminum hydroxide

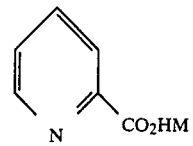

Basic zinc carbonate

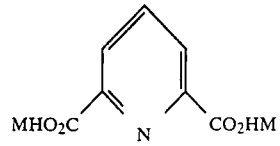

Basic magnesium carbonate

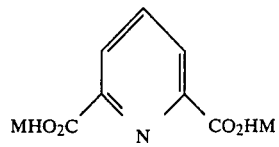

Calcium carbonate

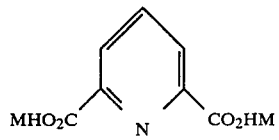

Zinc oxide

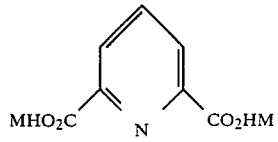

Calcium carbonate

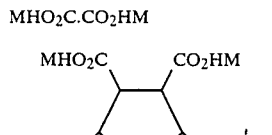

Calcium carbonate   $MHO_2C.CO_2HM$

Calcium carbonate

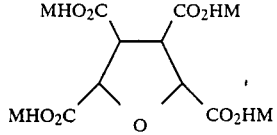

Barium carbonate   $MHO_2C-CO_2HM$
Calcium carbonate   MH salt of tripolyphosphoric acid
Calcium carbonate   MH salt of citric acid
Calcium carbonate   MH salt of polyacrylic acid Calcium carbonate

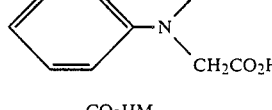

Magnesium oxide

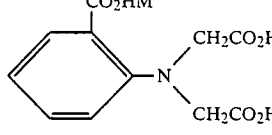

Zinc hydroxide

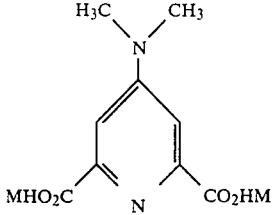

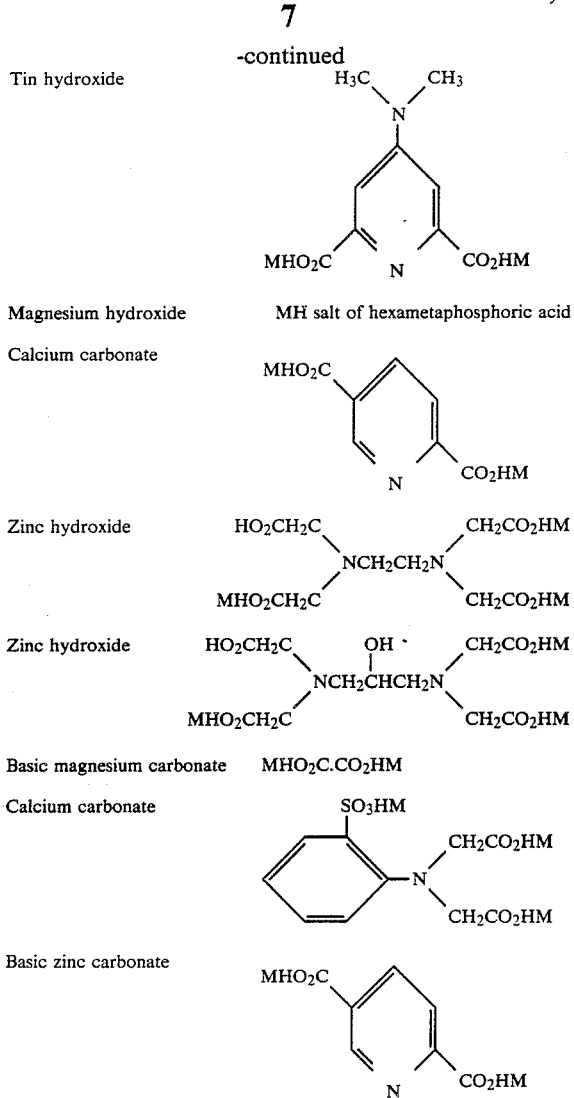

| Tin hydroxide | (structure) |
| Magnesium hydroxide | MH salt of hexametaphosphoric acid |
| Calcium carbonate | (structure) |
| Zinc hydroxide | (structure) |
| Zinc hydroxide | (structure) |
| Basic magnesium carbonate | MHO$_2$C.CO$_2$HM |
| Calcium carbonate | (structure) |
| Basic zinc carbonate | (structure) |

These combinations may be used alone or in admixture of two or more. They may be used along with any well-known bases or base precursors.

The mechanism of increasing the pH of the reaction system according to the present invention will be described by referring to one exemplary combination of guanidine picolinate with zinc hydroxide. Their reaction may be represented by the following scheme:

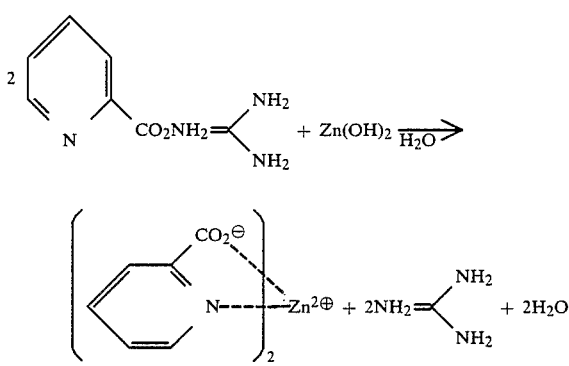

When guanidine picolinate and zinc hydroxide are mediated by water, picolinate ions make a complexing reaction with zinc ions and the reaction proceeds according to the above-illustrated scheme, exhibiting a high alkalinity.

The progress of this reaction is attributable to the stability of the resulting complexes. Picolinate ions (L$^-$) and zinc ions (M$^+$) form complexes ML, ML$_2$, and ML$_3$ having a very high stability constant as shown below, which well accounts for the progress of the reaction.

|  | ML | ML$_2$ | ML$_3$ |
| --- | --- | --- | --- |
| logK | 5.30 | 9.62 | 12.92 |

In the practice of the present invention, it is desirable that the difficultly soluble metal compound and the complexing compound are independently contained in at least one layer on separate supports.

In one preferred embodiment, the difficultly soluble metal compound is contained in a light-sensitive material and the complexing compound contained in an image-receiving material. The complexing compound may be supplied as a solution in water to participate in the reaction. It is desirable to incorporate the difficultly soluble metal compound as a fine particulate dispersion which may be prepared by the methods described in Japanese Patent Application Kokai Nos. 59-174830 and 53-102733. In such dispersions, the compounds preferably have an average particle size of 50 μm or less, especially 5 μm or less.

The amount of the difficultly soluble metal compound or complexing compounds contained in a layer on a support depends on the particular type of compound used, the particle size of the difficultly soluble metal compound, complexing reaction rate and other factors. Preferably, each compound is used in an amount of up to 50% by weight based on the weight of a coating containing the compound, and more preferably in an amount of 0.01 to 40% by weight. When the complexing compound is supplied as a solution in water to participate in the reaction, the aqueous solution is preferably prepared to a concentration of 0.005 to 5 mol/liter, more preferably 0.05 to 2 mol/liter. The content of the complexing compound in the reaction system is 1/100 to 100 folds in molar ratio, especially 1/10 to 20 folds more than that of the difficultly soluble metal compound.

The present invention encompasses any image forming processes in which image forming reaction takes places under alkaline conditions.

In the practice of the present invention, it is most preferable to use a silver halide as the light-sensitive material.

The image forming process of the present invention has one preferred embodiment of the type wherein a diffusible or mobile dye produced at sites corresponding or counter-corresponding to silver images can be transferred to a dye-fixing layer at the same time as development by heating in the presence of a small amount of water after imagewise exposure or simultaneously with imagewise exposure.

The image forming process of the present invention will be described by referring to one exemplary dye-providing substance containing a reducing substrate.

In the process for forming dye images according to the present invention, imagewise exposure is followed by heat development in the presence of water whereby an oxidation-reduction reaction takes place between the exposed light-sensitive silver halide and the reducing dye-providing substance in the case of a negative emulsion, for example. Then silver images are formed at the exposed areas and the dye-providing substance is converted to an oxidant to release a hydrophilic diffusible dye. As a result, the silver images and diffusible dye are available at the exposed areas. The foregoing reaction is promoted by a dye release aid, if present.

The thus produced diffusible dye is immediately transferred to the dye-fixing layer because of the presence of water. The dye image is thus obtained within a short time. The use of an auto positive emulsion follows the same procedure as the negative emulsion except that silver images and diffusible dye are available at unexposed areas.

Useful image forming processes using a dye-providing substance which produces or releases a diffusible dye in proportion or counter-proportion to the reaction of reducing light-sensitive silver halide to silver at elevated temperatures are disclosed in Japanese Patent Application Kokai Nos. 58-149046, 59-154445, 59-165054, and 59-180548, U.S. Pat. Nos. 4,503,137, 4,474,867, 4,483,914, and 4,455,363, and copending Japanese Patent Application No. 60-33491, which are all incorporated herein by reference.

One illustrative process of forming color images by heat development according to the present invention is to transfer a hydrophilic diffusible dye. For this purpose, the light-sensitive material used in the practice of the present invention includes on a support a light-sensitive layer (I) containing at least a silver halide, an optional organic silver salt oxidizing agent, an optional reducing agent, a dye-providing substance, and a binder and an image receiving or dye-fixing layer (II) capable of receiving a hydrophilic diffusible dye resulting from layer (I).

The above-mentioned light-sensitive layer (I) and dye-fixing layer (II) may be formed on either the same support or separate suports. Also employable is an arrangement wherein dye-fixing layer (II) can be peeled from light-sensitive layer (I). For example, the light-sensitive material is imagewise exposed and uniformly heat developed, whereupon dye-fixing layer (II) or light-sensitive layer (I) may be removed by peeling. When a light-sensitive material having light-sensitive layer (I) coated on a support and a fixing material having dye-fixing layer (II) coated on another support are individually prepared, the light-sensitive material is imagewise exposed, the fixing material is placed on the light-sensitive material, and the assembly is uniformly heated in the presence of water, thereby transferring the diffusible dye to dye-fixing layer (II).

The amount of water used in this embodiment may be as small as at least one tenth of the weight of the overall coatings of the light-sensitive and dye-fixing elements, preferably from one tenth of said weight up to the weight of solvent corresponding to the maximum swollen volume of the overall coatings, particularly up to the weight of solvent corresponding to the maximum swollen volume of the overall coatings minus the weight of the overall coatings.

Coatings in swollen state are unstable and have the likelihood that local bleeding will occur under certain conditions. To avoid such bleeding, water should be supplied in an amount up to that corresponding to the maximum swollen volume of the overall coatings of light-sensitive material and dye-fixing material. More particularly, water may be preferably supplied in an amount of 1 to 50 grams, more preferably 2 to 35 grams, and most preferably 3 to 25 grams per square meter of the combined surfaces of the light-sensitive material and dye-fixing material.

The dye-fixing layer (II) may contain a dye mordant, for example, for the purpose of dye fixing. The mordants used herein may be selected from a variety of mordants although polymeric mordants are preferred.

The silver halides used in the present invention include silver chloride, silver bromide, silver iodide, silver chlorobromide, silver chloroiodide, silver iodobromide, and silver chloroiodobromide, but not limited thereto.

The silver halide grains may have a uniform halogen composition or a multiple structure varying in composition from the surface to the interior (see Japanese Patent Application Kokai Nos. 57-154232, 58-108533, 59-48755, and 59-52237; U.S. Pat. No. 4,433,048; and European Patent No. 100,984). Also useful are plate particles having a thickness of up to 0.5 $\mu$m, a diameter of at least 0.6 $\mu$m, and an average aspect ratio of at least 5 (see U.S. Pat. Nos. 4,414,310 and 4,435,499 and German Patent Appplication (OLS) No. 3,241,646A1) and monodispersed emulsion having approximately uniform grain size distribution (see Japanese Patent Application Kokai Nos. 57-178235, 58-100846, and 58-14829, International Publication 83/02338A1, European Patent Nos. 64,412A3 and 83,377A1). More than one silver halide having different crystal habit, halogen composition, grain size, or grain size distribution may also be used in admixture. More than one monodispersed emulsion having different grain size may be mixed so as to regulate gradation.

The silver halide used in the present invention preferably has an average grain size of from 0.001 $\mu$m to 10 $\mu$m and more preferably from 0.001 $\mu$m to 5 $\mu$m.

The silver halide emulsion may be prepared by any of acidic, neutral, and ammoniacal methods while the type of reaction of soluble silver salt with soluble halide may be a single-jet and/or double-jet method. Also employable are reverse-mixing where grains are formed in the presence of an excess of silver ions and the controlled double-jet method where a constant pAg is kept. In order to accelerate grain growth, the concentration, amount, and addition rate of silver salt and halide added may be increased (see Japanese Patent Application Kokai Nos. 55-142329 and 55-158124 and U.S. Pat. No. 3,650,757). Silver halide grains of epitaxial junction type may also be used (see Japanese Patent Application Kokai No. 56-16124 and U.S. Pat. No. 4,094,684).

In preparing the silver halide grains useful in the practice of the present invention, any suitable solvent for the silver halide may be used, for example, ammonia, organic thioether derivatives as disclosed in Japanese Patent Publication No. 47-11386, and sulfur-containing compounds as disclosed in Japanese Patent Application Kokai No. 53-144319.

In the stage of grain forming or physical ripening, there may coexist such salts as cadmium, zinc, lead, and thallium salts.

For the purpose of improving high or low intensity reciprocity law failure, there may be employed water-soluble iridium salts such as iridium (III, IV) chlorides and ammonium hexachloroiridate, and water-soluble rhodium salts such as rhodium chloride.

The silver halide emulsions may be removed of soluble salts after precipitaion or physical ripening and thus subjected to Nudel precipitaion or physical ripening and thus subjected to Nudel water rinsing or sedimentation to this end. The silver halide emulsions may be applied without post-ripening, but ordinarily after chemical sensitization. For chemical sensitization purpose, there may be used sulfur sensitization, reducing sensitization, noble metal sensitization and other processes which are well known in connection with the emulsions for photosensitive materials of the ordinary type, and combinations thereof. Such chemical sensitization may be carried out in the presence of a nitrogen-containing heterocyclic compound as disclosed in Japanese Patent Application Kokai Nos. 58-126526 and 58-215644.

The silver halide emulsions used in the practice of the present invention may be either of the surface latent image type wherein latent images are predominantly formed on the grain surface or of the internal latent image type wherein latent images are formed in the grain interior. Also employable is a direct reversal emulsion having an internal latent image type emulsion combined with a nucleating agent. The internal latent image type emulsions useful for this purpose are described in U.S. Pat. Nos. 2,592,250 and 3,761,276, Japanese Patent Publication No. 58-3534 and Japanese Patent Application Kokai No. 57-136641, and the like. The nucleating agents suitable for use in such combination are described in U.S. Pat. Nos. 3,227,552, 4,245,037, 4,255,511, 4,266,031, and 4,276,364, OLS No. 2,635,316, and the like.

The amount of the photosensitive silver halide coated preferably ranges from 1 mg/m$^2$ to 10 g/m$^2$ of silver.

In the practice of the present invention, an organic metal salt which is relatively stable to light may be used as an oxdizing agent in combination with the photosensitive silver halide. It is necessary that the photosensitive silver halide and the organic metal salt be in contact with or close to each other. Preferred among these organic metal salts are organic silver salts. These organic metal salts are effective when heat-developable photosensitive materials containing the same are developed by heating at a temperature of at least 50° C., preferably at least 60° C.

Examplary of the organic compounds which can be used to form the above-mentioned organic silver salt oxidizing agents, there may be given aliphatic and aromatic carboxylic acids, thiocarbonyl-containing compounds having a mercapto group or alpha-hydrogen, imino-containing compounds, and the like.

Typical examples of the silver salts of aliphatic carboxylic acids include silver salts derived from behenic acid, stearic acid, oleic acid, lauric acid, capric acid, myristic acid, palmitic acid, maleic acid, fumaric acid, tartaric acid, furoic acid, linolic acid, linoleic acid, adipic acid, sebacic acid, succinic acid, acetic acid, butyric acid, propiolic acid, and camphoric acid. Also employable are those silver salts derived from halogen- or hydroxyl-substituted ones of these fatty acids and aliphatic carboxylic acids having a thioether group.

Typical examples of the silver salts of aromatic carboxylic acids and other carboxyl-containing compounds include silver salts derived from benzoic acid, 3,5-dihydroxybenzoic acid, o-, m- or p-methylbenzoic acid, 2,4-dichlorobenzoic acid, acetamidebenzoic acid, p-phenylbenzoic acid, gallic acid, tannic acid, phthalic acid, terephthalic acid, salicylic acid, phenylacetic acid, pyromellitic acid, and 3-carboxymethyl-4-methyl-4-thiazoline-2-thione. Typical examples of the silver salts of mercapto or thiocarbonyl-containing compounds include silver salts derived from 3-mercapto-4-phenyl-1,2,4-triazole, 2-mercaptobenzimidazole, 2-mercapto-5-aminothiadiazole, 2-mercaptobenzothiazole, S-C$_{(12-22)}$ alkylthioglycolic acids, dithiocarboxylic acids such as dithioacetic acids, thioamides such as thiostearoamide, 5-carboxy-1-methyl-2-phenyl-4-thiopyridine, and mercapto compounds as disclosed in U.S. Pat. No. 4,123,274, for example, mercaptotriazine, 2-mercaptobenzoxazole, mercaptooxadiazole, and 3-amino-5-benzylthio-1,2,4-triazole.

Typical examples of the silver salts of iminocontaining compounds include silver salts derived from benzotriazole and its derivatives as disclosed in Japanese Patent Publication Nos. 44-30270 and 45-18416, for example, benzotriazole, alkyl-substituted benzotriazoles such as methylbenzotriazole, halo-substituted benzotriazoles such as 5-chlorobenzotriazole, and carboimidebenzotriazoles such as butylcarboimidebenzotriazole; nitrobenzotriazoles as disclosed in Japanese Patent Application Kokai No. 58-118639; sulfobenzotriazoles as disclosed in Japanese Patent Application Kokai No. 58-118638; carboxybenzotriazole and its salt or hydroxybenzotriazole; 1,2,4-triazoles and 1H-tetrazoles as disclosed in U.S. Pat. No. 4,220,709; carbazoles, saccharin, imidazole and their derivatives.

Also usable in the practice of the present invention are those silver salts described in Research Disclosure, No. 17029 (June 1978), organic metal salts other than silver salts such as copper stearate, and the silver salts of alkyl-containing carboxylic acids disclosed in Japanese Patent Application No. 58-221535, such as phenylpropiolic acid.

These organic silver salts may be used in amounts of from 0.01 to 10 mols, preferably from 0.01 to 1 mol per mol of the photosensitive silver halide. The combined amount of the photosensitive silver halide and the organic silver salt coated suitably ranges from about 50 mg/m$^2$ to 10 g/m$^2$.

The silver halides used in the practice of the present invention may be spectrally sensitized with methine dyes and other dyes. The dyes useful for spectral sensitization include cyanine dyes, merocyanine dyes, complex cyanine dyes, complex merocyanine dyes, holopolar cyanine dyes, hemicyanine dyes, styryl dyes, and hemioxonol dyes. Particularly useful dyes are cyanine dyes, merocyanine dyes, and complex merocyanine dyes. Any nuclei usually employed for cyanine dyes as basic heterocyclic ring nuclei may be applied to these dyes. For example, there are pyrroline nuclei, oxazoline nuclei, thiazole nuclei, selenazole nuclei, imidazole nuclei, tetrazole nuclei, pyridine nuclei, etc.; the nuclei formed by the fusion of aliphatic hydrocarbon rings to the foregoing nuclei and the nuclei formed by the fusion of aromatic hydrocarbon rings to the foreoing nuclei, such as indolenine nuclei, bezindolenine nuclei, indole nuclei, benzoxazole nuclei, naphthoxazole nuclei, benzothiazole nuclei, naphthothiazole nuclei, benzoselenazole nuclei, benzimidazole nuclei, quinoline nuclei, etc. These nuclei may be substituted on carbon atoms.

For the merocyanine dyes or complex merocyanine dyes, a 5- or 6-membered heterocyclic nucleus such as pyrazolin-5-one nucleus, thiohydantoin nucleus, a 2-thiooxazolidine-2,4-dione nucleus, a thiazolidine-2,4-dione nucleus, a rhodanine nucleus, a thiobarbituric acid nucleus, etc. may be applied as a nucleus having a ketomethylene structure.

These sensitizing dyes may be used individually or as a combination thereof. A combination of sensitizing dyes is frequently used for supersensitization.

In addition to the sensitizing dye, the emulsion may contain a dye which itself has no spectral sensitization function or a material which does not substantially absorb visible light, but exhibits supersensitization. There may be contained, for example, aminostyryl compounds substituted with a nitrogen-containing heterocyclic ring group as disclosed in U.S. Pat. Nos. 2,933,390 and 3,635,721; aromatic organic acid-formaldehyde condensates as disclosed in U.S. Pat. No. 3,743,510; cadmium salts, azaindene compounds, and the like. Particularly useful are those combinations disclosed in U.S. Pat. Nos. 3,615,613; 3,615,641; 3,617,295; and 3,635,721.

These sensitizing dyes may be incorporated in the silver halide photographic emulsions by directly dispersing them in the emulsions or alternatively, dissolving them in a single or mixed solvent such as water, methanol, ethanol, acetone, and methyl cellosolve and mixtures thereof before adding to the emulsions. The sensitizing dyes may also be added to the emulsions by dissolving them in a solvent substantially immiscible with water such as phenoxyethanol, dispersing the solution in water or hydrophilic colloid, and then adding the dispersion to the emulsion.

Furthermore, the sensitizing dyes may be combined with oleophilic compounds such as dye-providing substances and added to the emulsions concurrently therewith. In dissolving more than one sensitizing dye in combination, they may be individually dissolved or a mixture of them may be dissolved. In adding the sensitizing dyes to the emulsion, they may be simultaneously added as a mixture, or they may be separately added or simultaneously with another additive. The sensitizing dyes may be added to the emulsion during, before or after chemical ripening, or before or after nucleation of silver halide grains according to the teachings of U.S. Pat. Nos. 4,183,756 and 4,225,666.

The amount of the sensitizing dye is generally from $10^{-8}$ to $10^{-2}$ mol per mol of the silver halide.

In the present invention, there may be contained a compound which, when the photosensitive silver halide is reduced into silver at elevated temperatures, produces or releases a mobile or diffusible dye in direct or inverse proportion to the reaction. These compounds are simply referred to as dye-providing substances hereinafter.

Typical of the dye-providing substances which can be used in the present invention are couplers capable of reacting with a developing agent. Coupler based systems are such that oxidation-reduction reaction of a silver salt with a developing agent gives an oxidized form of developing agent which in turn, reacts with a coupler to form a dye, and many such systems are described in the literature. Illustrative examples of the developing agents and couplers are described in detail in, for example, T. H. James, "The Theory of the Photographic Process", 4th Ed., pages 291-334 and 354-361, and S. Kikuchi, "Photographic Chemistry", 4th Ed., Kyoritsu Publishing K.K., pages 284-295. Another class of dye-providing substances includes dye-silver compounds in which an organic silver salt is combined with a dye. Examples of the dye-silver compounds are described in Research Disclosure, May 1978, pages 54-58 (RD-16966).

A further class of dye-providing substance includes azo dyes which are generally used in the heat development silver dye bleaching process. Examples of the azo dyes and the bleaching process are described in U.S. Pat. No. 4,235,957 and Research Disclosure, April 1976, pages 30-32 (RD-14433), inter alia. Leuco dyes as described in U.S. Pat. Nos. 3,985,565 and 4,022,617 are further examples of the dye-providing substances.

A still further example of the dye-providing substances is a compound having the function of releasing or diffusing a diffusible dye imagewise.

The compounds of this type may be represented by the following formula [L I]:

$$(\text{Dye-X})_n\text{---Y} \qquad [\text{L I}]$$

wherein Dye represents a dye group or a dye precursor group; X represents a simple bond or a connecting group; and Y represents a group which, in correspondence or countercorrespondence to photosensitive silver salt having a latent image distributed imagewise, produces a difference in diffusibility of the compound represented by $(\text{Dye-X})_n$—Y or releases Dye, the diffusibility of Dye released being different from that of the compound represented by $(\text{Dye-X})_n$—Y, and n represents an integer of 1 or 2, when n=2, the Dye-X's may be the same or different.

Exemplary of the dye-providing substances having general formula [L I] there may be given dye developing reagents in the form of a hydroquinone-type developing reagent having a dye moiety attached thereto as disclosed in U.S. Pat. Nos. 3,134,764; 3,362,819; 3,597,200; 3,544,545 and 3,482,972. In addition, substances which release a diffusible dye through intramolecular nucleophilic substitution reaction are disclosed in Japanese Patent Application Kokai No. 51-63618 and substances which releases a diffusible dye through intramolecular rewind reaction of an isooxazolone ring are disclosed in Japanese Patent Application Kokai No. 49-111628. In the systems to which these substances are applied, a diffusible dye is released or diffused where no development has taken place and no dye is released or diffused where development has taken place.

Another system is proposed wherein the dye-providing substance is previously modified into an oxidant form having no dye releasing ability so that the modified substance may coexist with a reducing agent or precursor thereof. After development, the reducing agent which remains non-oxidized acts on the modified substance to reduce it, thereby releasing the diffusible dye. Typical examples of the dyeproviding substances usable in such a system are described in Japanese Patent Application Kokai Nos. 53-110827, 54-130927, 56-164342, and 53-35533.

Also known are substances which release a diffusible dye where development has occurred. The substances which release a diffusible dye through the reaction of an oxidation product of a developing reagent with a coupler having a diffusible dye as an eliminatable group are described in British Pat. No. 1,330,524; Japanese Patent Publication No. 48-39165; U.S. Pat. No. 3,443,940 and the like, and the substances which produce a diffusible dye through the reaction of an oxidation product of a developing reagent with a coupler having an anti-diffusible group as an eliminatable group are described in U.S. Pat. No. 3,227,550 and the like.

The systems using these color developing agents have the serious problem that the resulting image can be contaminated with oxidation decomposition products of a developing agent. To overcome this problem, a dye-releasing compound has been proposed which itself has a reducing ability without the need for a developing reagent. Typical examples of these compounds are presented below together with the patent or literature disclosing them. The definition of legends in the formulas is given in the corresponding literature.

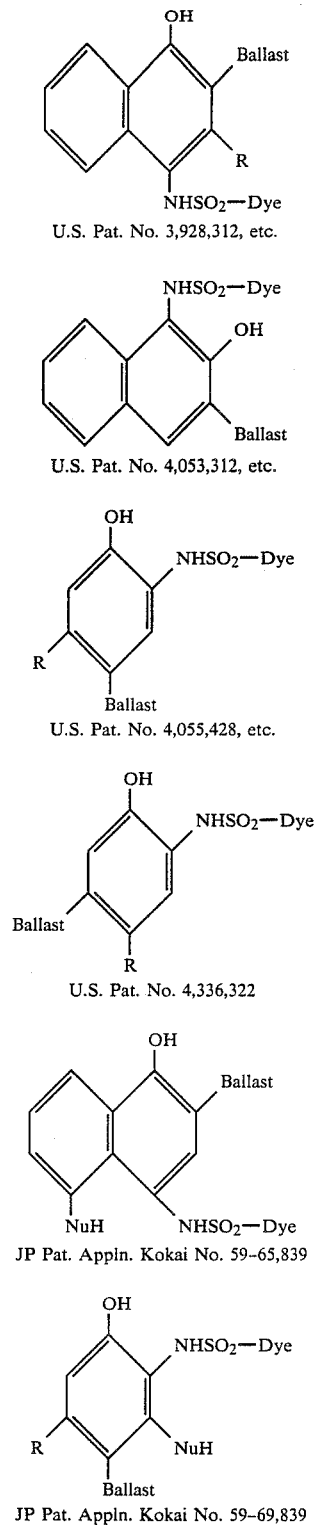

U.S. Pat. No. 3,928,312, etc.

U.S. Pat. No. 4,053,312, etc.

U.S. Pat. No. 4,055,428, etc.

U.S. Pat. No. 4,336,322

JP Pat. Appln. Kokai No. 59-65,839

JP Pat. Appln. Kokai No. 59-69,839

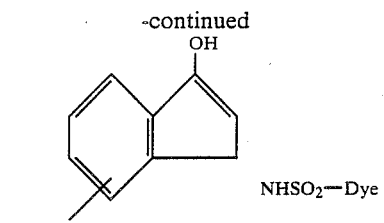

JP Pat. Appln. Kokai No. 53-3,819

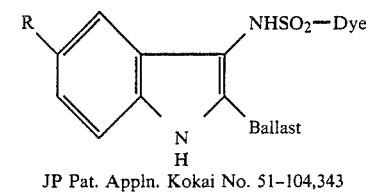

JP Pat. Appln. Kokai No. 51-104,343

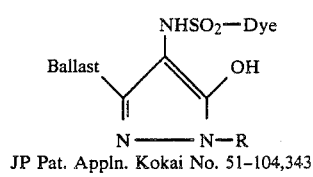

JP Pat. Appln. Kokai No. 51-104,343

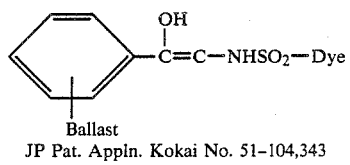

JP Pat. Appln. Kokai No. 51-104,343

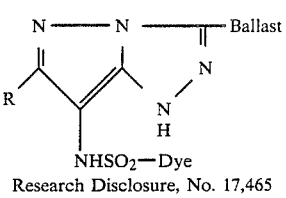

Research Disclosure, No. 17,465

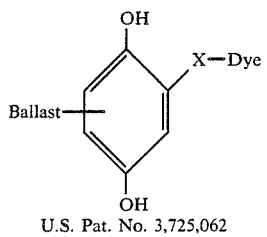

U.S. Pat. No. 3,725,062

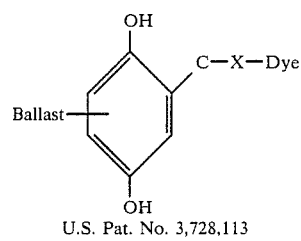

U.S. Pat. No. 3,728,113

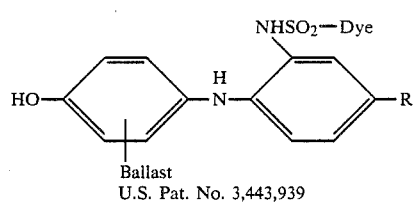

U.S. Pat. No. 3,443,939

-continued

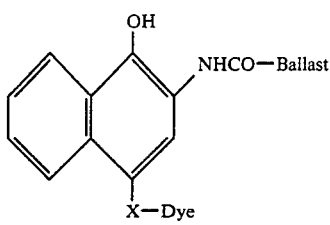

JP Pat. Appln. Kokai No. 58-116,537

Exemplary of the dye moiety represented by Dye there may be given those derived from azo dyes, azomethine dyes, anthraquinone dyes, naphthoquinone dyes, styryl dyes, nitro dyes, quinoline dyes, carbonyl dyes, phthalocyanine dyes, and other dyes. These dye moieties may also take the form having temporarily shortened wavelengths. Illustrative examples of the dye moieties released from the dye-providing substances are those chelate dyes described in the above-incorporated Japanese Patent Publication No. 57-194202, pages 37–59 and Japanese Patent Application Kokai No. 53-35533.

Any of the foregoing dye-providing substances may be used in the practice of the present invention.

Illustrative examples of the image-forming substances which may be used in the practice of the present invention are described in the foregoing patents which are incorporated herein by reference.

In the practice of the present invention, the dyeproviding substances and other oil-soluble additives such as image formation accelerators as will be described later may be introduced into a layer of photosensitive material by any well-known methods, for example, the method described in U.S. Pat. No. 2,322,027. In this case, an organic solvent having a high boiling point or an organic solvent having a low boiling point as described below may be used.

For example, the dye-providing substance is first dissolved in a high-boiling organic solvent, for example, a phthalic acid alkyl ester (such as dibutyl phthalate, dioctyl phthalate, etc.), a phosphoric acid ester (such as diphenyl phosphate, triphenyl phosphate, tricresyl phosphate, dioctylbutyl phosphate, etc.), a citric acid ester (such as tributyl acetylcitrate, etc.), a benzoic acid ester (such as octyl benzoate, etc.), an alkylamide (such as diethyl laurylamide, etc.), a fatty acid ester (such as dibutoxyethyl succinate, dioctyl azelate, etc.), and a trimesic acid ester (such as tributyl trimesate, etc.); or an organic solvent having a low boiling point of about 30° C. to 160° C., for example, a lower alkyl acetate (such as ethyl acetate, butyl acetate, etc.), ethyl propionate, sec-butyl alcohol, methyl isobutyl ketone, beta-ethoxyethyl acetate, methyl cellosolve acetate, cyclohexanone, etc. Mixtures of the above-described high boiling organic solvents and low boiling organic solvents may also be used. The solution of the dye-providing substance may then be dispersed in a hydrophilic colloid.

Further, it is possible to use a method for dispersion in polymers as described in Japanese Patent Publication No. 51-39853 and Japanese Patent Application Kokai No. 51-59943. Moreover, various surface-active agents may be used when the dye-providing substance is dispersed in a hydrophilic colloid. For this purpose, the surface-active agents illustrated in other part of the specification may be used.

The amount of the high boiling organic solvent used in the present invention is up to 10 grams, preferably up to 5 grams per gram of the dye-providing substance.

In case the substance is substantially insoluble in water, it may be finely divided into particles before being incorporated in the binder as well as the aforementioned methods.

A reducing agent may desirably be used in the photosensitive material of the present invention. The reducing agents used herein include well-known reducing agents and the above-mentioned dye-providing substances having reducing ability. Also included are reducing agent precursors which themselves have no reducing nature, but exhibit reducing nature under the action of a nucleophilic agent or heat during the development process.

Examples of the reducing agents used herein include inorganic reducing agents such as sodium sulfite and sodium hydrogen sulfite, benzene sulfinic acids, hydroxylamines, hydrazines, hydrazides, boran-amine complexes, hydroquinones, aminophenols, catechols, p-phenylenediamines, 3-pyrazolidinones, hydroxytetronic acids, ascorbic acids, 4-amino-5-pyrazolones, etc. and the reducing agents described in T. H. James, "The Theory of the Photographic Process", the Fourth Edition, pages 291–334. Also usable are reducing agent precursors as disclosed in Japanese Patent Application Kokai Nos. 56-138736 and 57-40245, U.S. Pat. No. 4,330,617, and the like. Various combinations of developing reagents as described in U.S. Pat. No. 3,039,869 may also be used.

In the practice of the present invention, the reducing agent may be added in amounts of from 0.01 to 20 mols, preferably from 0.1 to 10 mols per mol of silver.

In the practice of the present invention, an image formation promotor may also be used. The image formation promotors have the functions of promoting such reaction as redox reaction of a silver salt-oxidizing agent with a reducing agent, formation of a dye from a dye-providing substance, decomposition of a dye or release of a mobile dye, and promoting transfer of a dye from a photosensitive material layer to a dye-fixing layer. From their physical-chemistry, they may be classified into bases, base precursors, nucleophilic compounds, oils, thermal solvents, surface-active agents, and compounds capable of interacting with silver or silver ion. It should be noted that these compounds generally have multiple functions and thus possess some of the above-mentioned promoting effects combined.

The image formation promotors are illustrated for each of functional classes. However, this classification is made for convenience of description and actually, one compound often possesses more than one function in combination.

(a) Bases

Preferred examples of the bases include (1) inorganic bases, for example, hydroxides, secondary and tertiary phosphates, borates, carbonates, quinolinates, and metaborates of alkali metals and alkaline earth metals; ammonium hydroxides; quarternary alkyl ammonium hydroxides; and other metal hydroxides; and (2) organic bases, for example, aliphatic amines such as trialkyl amines, hydroxylamines, and aliphatic polyamines; aromatic amines such as N-alkyl-substituted aromatic amines, N-hydroxyl-alkyl-substituted aromatic amines and bis[p-(dialkylamino)phenyl]methanes; heterocyclic amines, amidines; cyclic amidines; guanididines; and cyclic guanidines. The particularly preferred bases are those having a pKa value of 8 or higher.

Also useful are salts of the foregoing bases with weak acids, for example, salts of carbonic acid, bicarbonic acid, boric acid, secondary and tertiary phosphoric acid, quinolinic acid, acetic acid, and metaboric acid. In addition, the compounds disclosed in Japanese Patent Application Kokai No. 59-218443 may also preferably be used.

(b) Base precursors

Base precursors are preferably those precursors which undergo any reaction under heat to release a base, for example, organic acid-base salts which are decomposed or decarbonated upon heating, and compounds which are decomposed to release amines through such reactions as intramolecular nucleophilic substituting reaction, Lossen rearrangement, Beckman rearrangement, etc. and those precursors which generate a base through electrolysis. The preferred base precursors of the former type wherein a base is released upon heating include salts of trichloroacetic acid as described in British Pat. No. 998,949; salts of alpha-sulfonylacetic acid as described in U.S. Pat. No. 4,060,420; salts of propiolic acid as described in Japanese Patent Application No. 58-55700; 2-carboxylcarboxamide derivatives as described in U.S. Pat. No. 4,088,496; salts of thermally decomposable acids with a basic component containing an organic base and an alkali metal or alkaline earth metal as described in Japanese Patent Application No. 58-69597; hydroxamcarbamates utilizing Lossen rearrangement as described in Japanese Patent Application No. 58-43860; and aldoximcarbamates capable of forming nitriles upon heating as described in Japanese Patent Application No. 58-31614. In addition, base precursors as disclosed in British Pat. Nos. 998,945 and 2,079,480; U.S. Pat. No. 3,220,846; and Japanese Patent Application Kokai No. 50-22625, etc. are also useful.

Preferred precursors of the latter type wherein a base is released through electrolysis include the following examples. A typical process based on electrolytic oxidation is electrolysis of various fatty acid salts. These reactions efficiently yield carbonate salts of alkali metals and organic bases such as guanidines and amidines.

Another process uses electrolytic reduction as exemplified by formation of amines by reduction of nitro and nitroso compounds; formation of amines by reduction of nitriles; and formation of p-aminophenols, p-phenylene diamines, and hydrazines by reduction of nitro compounds, azo compounds, and azoxy compounds. It will be understood that p-aminophenols, p-phenylene diamines, and hydrazines may be used not only as the base, but also directly as a color image forming substance.

Electrolysis of water in the co-presence of various inorganic salts to generate an alkali component is, of course, employable.

(c) Nucleophilic compounds

Exemplary of the nucleophilic compounds there may be given water, water-releasing compounds, amines, amidines, guanidines, hydroxylamines, hydrazines, hydrazides, oximes, hydroxamic acid derivatives, sulfonamides, active methylene compounds, alcohols, and thiols, as well as salts and precursors of these compounds.

(d) Oils

Useful are those high-boiling organic solvents which are used as a solvent in emulsion dispersing a hydrophobic compound and also known as plasticizers.

(e) Thermal solvents

The thermal solvents are those compounds which are solid at an ambient temperature, but melts at approximately developing temperatures to serve as solvents. Useful are ureas, urethanes, amides, pyridines, sulfonamides, sulfones, sulfoxides, esters, ketones and ethers, provided that they are solid at temperatures of lower than 40° C.

(f) Surface-active agents

Typical surface-active agents are pyridinium salts, ammonium salts, and phosphonium salts as disclosed in Japanese Patent Application Kokai No. 59-74547, and polyalkylene oxides as disclosed in Japanese Patent Application Kokai No. 59-57231.

(g) Compounds capable of interacting with silver or silver ion

Useful are imides, nitrogen-containing heterocyclic compounds as disclosed in Japanese Patent Application No. 58-51657, thiols as disclosed in Japanese Patent Application No. 57-222247, thioureas, and thioethers.

These image formation promotors may be incorporated in the photosensitive material and/or the dye-fixing material. The particular layer into which the image formation promotors are incorporated may be any of the emulsion layer, intermediate layer, protective layer, image-receiving or dye-fixing layer, and layers adjoining any of these layers. The same applies to an embodiment where both the photosensitive layer and the dye-fixing layer are on a common support.

The image formation promotors may be used alone or in admixture of two or more. Generally, the promoting effect is enhanced by the use of more than one promotor. An outstanding promoting effect is obtained particularly when the base or base precursor is combined with another promotor.

In the practice of the present invention, a variety of development inhibitors may be used for the purpose of obtaining a consistent image irrespective of variations in treating temperature and time during heat development. By the development inhibitor is meant those compounds capable of, immediately after development has proceeded to an optimum extent, neutralizing or reacting with a base to reduce its concentration in the film to inhibit development, or those compounds capable of, immediately after optimum development, interacting with silver or silver salt to retard development. Illustrative examples are acid precursors capable of releasing acid upon heating, electrophilic compounds capable of substitution reaction with a coexisting base upon heating, nitrogen-containing heterocyclic compounds, mercapto compounds and their precursors, and the like. Specific examples of the acid precursors are oxime esters as disclosed in Japanese Patent Application Nos. 58-216928 and 59-48305, and those compounds capable of releasing an acid through Lossen rearrangement as disclosed in Japanese Patent Application No. 59-85834. Specific examples of the electrophilic compounds capable of substitution reaction with a base upon heating are such compounds as disclosed in Japanese Patent Application No. 59-85836, etc.

Also useful are those compounds which release mercapto compounds upon heating, for example, those described in the following Japanese Patent Applications.

| | | |
|---|---|---|
| 59-190173 | 59-268926 | 59-246468 |
| 60-26038 | 60-22602 | 60-26039 |
| 60-24665 | 60-29892 | 59-176350 |

The effect of these development inhibitors is enhanced particularly when they are combined with base precursors. The proportion of the base precursor to the acid precursor used herein may preferably range from 1/20 to 20/1, and more preferably, from 1/5 to 5/1 in molar ratio.

Further, in the present invention, it is possible to use a compound which activates development simultaneously with stabilizing the image. Particularly preferred compounds used herein are isothiuroniums including 2-hydroxyethylisothiuronium trichloroacetate as described in U.S. Pat. No. 3,301,678; bisisothiuroniums including 1,8-(3,6-dioxaoctane)-bis(isothiuronium trichloroacetate) as described in U.S. Pat. No. 3,669,670; thiol compounds as described in German Patent Application (OLS) No. 2,162,714; thiazolium compounds such as 2-amino-2-thiazolium trichloroacetate, 2-amino-5-bromoethyl-2-thiazolium trichloroacetate, etc., as described in U.S. Pat. No. 4,012,260; and compounds having alpha-sulfonylacetate as an acid part such as bis(2-amino-2-thiazolium)-methylene-bis(sulfonylacetate), 2-amino-2-thiazolium phenylsulfonyl-acetate, etc. as described in U.S. Pat. No. 4,060,420.

Also preferred are azolthio ethers and blocked azolinthione compounds as described in Belgian Pat. No. 768,071; 4-aryl-1-carbamyl-2-tetrazoline-5-thione compounds as described in U.S. Pat. No. 3,893,859; and those compounds described in U.S. Pat. Nos. 3,839,041; 3,844,788; and 3,877,940.

A variety of anti-fogging agents may be used in the practice of the present invention. Preferred anti-fogging agents are azoles, nitrogen-containing carboxylic acids and phosphoric acids as described in Japanese Patent Application Kokai No. 59-168442, and mercapto compounds and metals salts thereof as described in Japanese Patent Application Kokai No. 59-111636. These anti-fogging agents may be used in concentrations ranging from 0.001 to 10 mols per mol of silver.

The photosensitive material of the present invention may contain a toning agent if desired. Useful toning agents are phthalazinones, 1,2,4-triazoles, 1H-tetrazoles, thiouracils, 1,3,4-thiadiazoles, and similar compounds. Examples of the preferred toning agents include 5-amino-1,3,4-thiadiazole-2-thiol, 3-mercapto-1,2,4-triazole, bis(dimethylcarbamyl)disulfide, 6-methylthiouracil, 1-phenyl-2-tetrazoline-5-thione, and the like. Particularly effective toning agents are compounds which can impart a black color tone to images.

The content of such a toning agent as described above generally ranges from about 0.001 to 0.1 mol per mol of silver in the photosensitive material although the exact content depends upon the type of a heat developable photosensitive material used, processing conditions, desired images and various other factors.

In the practice of the present invention, the binders may be employed alone or in combinations thereof. The preferred binder used is a hydrophilic binder. The typical hydrophilic binder is a transparent or translucent hydrophilic binder, examples of which include natural substances, for example, proteins such as gelatin, gelatin derivatives and cellulose derivatives and polysaccharides such as starch, gum arabic etc.; and synthetic polymers, for example, water-soluble polyvinyl compounds such as polyvinyl pyrrolidone, acrylamide polymer, etc. Another example of the synthetic polymer compound is a dispersed vinyl compound in a latex form which is used for the purpose of increasing the dimensional stability of a photographic material.

Also employable are the compounds disclosed in Research Disclosure, December 1978, page 26, Chapter IX, section A.

The binders may be coated in amounts of up to 20 grams per square meter, preferably up to 10 grams per square meter, and most preferably up to 7 grams per square meter.

The high-boiling organic solvent may be dispersed in the binder together with hydrophobic compounds, for example, a dye-providing substance such that the volume of the solvent is less than about 1 cc, preferably less than about 0.5 cc, and most preferably less than about 0.3 cc per gram of the binder.

In the heat-developable photosensitive material and the dye-fixing material according to the present invention, the photographic emulsion layer, conductive layers, dye-fixing layer and other binder layers may contain inorganic or organic hardeners. It is possible to use chromium salts such as chromium alum, chromium acetate, etc.; aldehydes such as formaldehyde, glyoxal, glutaraldehyde, etc.; N-methylol compounds such as dimethylolurea, methylol dimethylhydantoin, etc.; dioxane derivatives such as 2,3-dihydroxydioxane, etc.; active vinyl compounds such as 1,3,5-triacryloyl-hexahydro-s-triazine, 1,3-vinylsulfonyl-2-propanol, 1,2-bis(vinylsulfonylacetamide)ethane, etc.; active halogen compounds such as 2,4-dichloro-6-hydroxy-1,3,5-triazine, etc.; mucohalogenic acids such as mucochloric acid, mucophenoxychloric acid, etc. or the like alone or in combinations of two or more.

The support used in the light-sensitive material of the present invention and the optional dye-fixing material must withstand the processing temperature. Exemplary of ordinary supports there may be given not only glass, paper, metal and analogues, but also an acetyl cellulose film, a cellulose ester film, a polyvinyl acetal film, a polystyrene film, a polycarbonate film, a polyethylene terephthalate film, and a film or plastic material related thereto. Further, a paper support laminated with a polymer such as polyethylene, etc. may be used. Those polyesters described in U.S. Pat. Nos. 3,634,089 and 3,725,070 are preferably used.

When the dye-providing substance having general formula (L I) as defined above is contained in the heat-developable photosensitive material of the present invention, such additives as anti-irradiation and antihalation substances and various dyes need not necessarily be contained in the photosensitive material because of coloring of the dyeproviding substance. For the purpose of improving the sharpness of an image, filter dyes, absorptive materials and the like may be contained as disclosed in Japanese Patent Publication No. 48-3692; U.S. Pat. Nos. 3,253,921; 2,527,583; and 2,956,879; etc. Preferred among these dyes are thermally decoloring dyes, for example, those disclosed in U.S. Pat. Nos. 3,769,019; 3,745,009; and 3,615,432.

The photosensitive materials of the present invention may optionally contain any of a variety of additives well known for use in heat-developable photosensitive materials and possess in addition to the photosensitive layer, any layers including protective layer intermediate layer, AH layer, and release layer. Examples of the additives include such additives as disclosed in Research Disclosure, Vol. 170, June 1978, No. 17029, for example, plasticizers, sharpness improving dyes, AH dyes, sensitizing dyes, matte agents, surface-active agents, brightening agents, discoloration retarders, etc.

When the photographic element according to the present invention comprises a photosensitive element which forms or releases a dye through heat development and optionally, a dye-fixing element which fixes the dye. Particularly, systems of forming an image through diffusion transfer of a dye need the photosensitive and dye-fixing elements as requisite elements. They are generally classified into two typical forms, one form having photosensitive and dye-fixing layers separately applied on two separate supports and another form having both photosensitive and dye-fixing layers applied on a common support.

The former system having photosensitive and dye-fixing elements separately applied on two separate supports is generally sub-classified into two types, peeling type and non-peel type. In the case of peeling type, the coated surface of the photosensitive element is overlapped the coated surface of the dye-fixing element after imagewise exposure or heat development, and the photosensitive element is separated from the dye-fixing element immediately after formation of a transfer image. Depending on whether the final image is of reflective or transmissive type, the support of the dye-fixing element may be selected among opaque or transparent supports. If desired, a white reflective layer may be applied. In the case of non-peel type, a white reflective layer must be interposed between the photosensitive layer of the photosensitive element and the dye-fixing layer of the dye-fixing element while the white reflective layer may be applied to either the photosensitive element or the dye-fixing element. The support of the dye-fixing element must be transparent support.

The latter system having both light-sensitive and dye-fixing elements applied on a common support is typically one wherein the photosensitive element need not be peeled from the image-receiving element after formation of a transfer image. In this case, a photosensitive layer, a dye-fixing layer, and a white reflective layer are laminated on a transparent or opaque support. The preferred arrangements are transparent or opaque support/photosensitive layer/white reflective layer/dye-fixing layer and transparent support/dye-fixing layer/white reflective layer/photosensitive layer, to name a few.

Another typical form having both light-sensitive and dye-fixing elements applied on a common support is one wherein a release layer is applied at a proper location such that the photosensitive element may be entirely or partially separated from the dye-fixing element, as disclosed in Japanese Patent Application Kokai No. 56-678407, Canadian Pat. No. 674,082, and U.S. Pat. No. 3,730,718.

The photosensitive or dye-fixing element may be one possessing an electroconductive heating element layer as heating means for heat development or diffusion transfer of a dye.

In order to provide a wide range of color within the chromaticity diagram using the three primary colors, yellow, magenta and cyan, the photosensitive elements used in the present invention should include at least three silver halide emulsion layers having sensitivity in different spectra.

Typical combinations of at least three silver halide emulsion layers having sensitivity in different spectra are a combination of blue-sensitive emulsion layer/green-sensitive emulsion layer/red-sensitive emulsion layer, a combination of green-sensitive emulsion layer/red-sensitive emulsion layer/infrared-sensitive emulsion layer, a combination of blue-sensitive emulsion layer/green-sensitive emulsion layer/infrared-sensitive emulsion layer, and a combination of blue-sensitive emulsion layer/red-sensitive emulsion layer/infrared-sensitive emulsion layer. By the infrared-sensitive emulsion layer used herein it is meant that the emulsion layer is sensitive to light having a wavelength of more than 700 nm, particularly more than 740 nm.

The photosensitive materials used in the present invention may have two or more emulsion layers having sensitivity in the same spectrum, but different in emulsion sensitivity.

Each of the above-mentioned emulsion layers and/or photo-insensitive hydrophilic colloid layer disposed adjacent thereto should contain either of a dye-providing substance which releases or forms a hydrophilic yellow dye, a dye-providing substance which releases or forms a hydrophilic magenta dye, and a dye-providing substance which releases or forms a hydrophilic cyan dye. Differently stated, each emulsion layer and/or a photo-insensitive hydrophilic colloid layer disposed adjacent thereto should contain a dye-providing substance which releases or forms a hydrophilic dye of different hue. If desired, mixtures of two or more dye-providing substances having the same hue may be used. When the dye-providing substance is originally colored, the dye-providing substance may advantageously be contained in a layer other than this emulsion layer. In addition to the above-mentioned layers, the photosensitive materials of the present invention may further include any auxiliary layers, for example, a protective layer, intermediate layer, antistatic layer, anti-curling layer, release layer, and matte agent layer.

More specifically, the protective layer or coat (PC) usually contains an organic or inorganic matte agent for adherence prevention. The protective layer may futher contain a mordant, a UV-absorber, etc. Each of the protective and intermediate layers may be comprised of two or more layers.

The intermediate layer may contain a reducing agent, a UV absorber, and a white pigment such as $TiO_2$ in order to prevent color mixing. The white pigment may be added not only to the intermediate layer, but also to the emulsion layers for the purpose of increasing sensitivity.

Such color sensitivity may be imparted to silver halide emulsions by subjecting each silver halide emulsion to dye sensitization with any well-known sensitizing dye to provide a desired spectral sensitivity.

The dye-fixing element used in the present invention has at least one layer containing a mordant. When the image-receiving or dye-fixing layer is positioned at the surface, a protective. layer may further be applied thereon if necessary.

Further, in order that a dye transfer assistant may be contained in a sufficient amount or controlled, a water-absorbing layer or dye transfer assistant-containing layer may be provided. Such a layer may be. applied contiguous to the dye-fixing layer or via an intermediate layer.

The dye-fixing layer used in the practice of the invention may be divided into two layers containing mordants having different mordanting power, if necessary.

The dye-fixing element used in the practice of the present invention may include any auxiliary layer, for example, a release layer, matte agent layer, and anti-curling layer.

One or more of the above-mentioned layers may contain a base or base precursor for promoting dye transfer, hydrophilic thermal solvent, anti-discoloration agent for preventing discoloration of dyes, UV absorber, dispersed vinyl compound for increasing dimensional stability, and brightening agent.

The binders used in the above-mentioned layers are preferably hydrophilic, and typically transparent or translucent hydrophilic colloids. Examplary of the hydrophilic binders there may be given natural substances, for example, proteins such as gelatin, gelatin derivatives, cellulose derivatives, etc, and polysaccharides such as starch, dextrin, pluran, gum arabic, etc., and synthetic polymers, for example, water-soluble polyvinyl compounds such as polyvinyl alcohol and polyvinyl pyrrolidone, acrylamide polymers, etc. Particularly useful among them are gelatin and polyvinyl alcohol.

The dye-fixing element may further include in addition to the above-mentioned layers, a reflective layer containing a white pigment like titanium oxide, neutralizing layer, neutralization timing layer or the like depending on the intended application. These layers may also be provided in the heat-developable photosensitive element as well as in the dye-fixing element. The organization of these reflective, neutralizing, and neutralization timing layers is described, among others, in U.S. Pat. Nos. 2,983,606; 3,362,819; 3,362,821; and 3,415,644; and Canadian Patent No. 928,559.

The preferred dye-fixing element used in the practice of the present invention is of a form containing a dye transfer assistant. The transfer assistant may be contained in the aforementioned dye-fixing layer or in a separately formed layer.

The dye-fixing layer used in the practice of the present invention may be a dye-fixing layer commonly used in heat-developable color light-sensitive materials. The mordants contained in the dye-fixing layer may be selected from commonly used mordants although polymeric mordants are particularly preferred. The polymeric mordants include poymers containing a tertiary amino group, polymers having a nitrogen-containing heterocyclic moiety, and polymers containing a quaternary cationic group.

Those polymers containing vinyl monomer units having a tertiary amino group are described in Japanese Patent Application Nos. 58-169012 and 58-166135. Those polymers containing vinyl monomer units having a tertiary imidazole group are described in Japanese Patent Application Nos. 58-226497 and 58-232071; U.S. Pat. Nos. 4,282,305; 4,115,124; and 3,148,061. Those polymers containing vinyl monomer units having a quaternary imidazolium salt are described in U.K. Patent Nos. 2,056,101; 2,093,041; and 1,594,961; U.S. Pat. Nos. 4,124,386; 4,115,124; 4,273,853; and 4,450,224; and Japanese Patent Application Kokai No. 48-28225. Those polymers containing vinyl monomer units having a quaternary ammonium salt are described in U.S. Pat. Nos. 3,709,690; 3,898,088; and 3,958,995; Japanese Patent Application Nos. 58-166135, 58-169012; 58-232070, 58-232072, and 59-91620.

When developing means used in connection with the present light-sensitive material is electrical conduction heating, a transparent or opaque heating element may be prepared by a prior art technique well known for resistance heating elements. Such a resistance heating element may be prepared by utilizing a thin film of a semiconductive inorganic material or an organic thin film of conductive fine particles dispersed in a binder. The material which can be used in the former include silicon carbide, molybdenum silicide, lanthanum chromate, barium titanate ceramics used in PTC thermistors, tin oxide, and zinc oxide, and they may be formed into a transparent or opaque thin film by a well-known method. In the latter case, a resistive body having the desired temperature properties is prepared by dispersing conductive fine particles such as metal fine particles, carbon black, and graphite in rubber, synthetic polymer or gelatin. The resistive body may be in direct contact with the light-sensitive element or spaced therefrom through fhe support, intermediate layer or the like.

Some illustrative arrangements of the heating element and the light-sensitive element are shown below:

Heating element/support/light-sensitive element;
Support/heating element/light-sensitive element;
Support/heating element/intermediate layer/light-sensitive element;
Support/light-sensitive element/heating element; and
Support/light-sensitive element/intermediate layer/heating element.

In the practice of the present invention, the protective layer, intermediate layer, undercoat layer, backcoat layer and other layers may be formed in the same manner as the light-sensitive layer and dye-fixing layer, for example, preparing the respective coating liquids followed by succesive coating on a support by any desired coating techniques including dipping, air knife coating, curtain coating, and hopper coating as described in U.S. Pat. No. 3,681,294. After drying, there is obtained a desired light-sensitive material.

If desired, two or more layers may be simultaneously applied by the techniques described in U.S. Pat. No. 2,761,791 and British Patent No. 837,095.

The light source for image exposure to record an image in the heat-developable light-sensitive material may be any radiation including visible light. In general, light sources used in ordinary color printing may be used, for example, tungsten lamps, mercury lamps, halogen lamps like iodine lamps, xenon lamps, laser sources, CRT sources, fluorescent lamps, light emitting diodes (LED), and the like.

Heating means used during the development or transfer step in the practice of the present invention may be any suitable heating means, for example, the above-mentioned heating elements, simple heat blocks, irons, heat rollers, radiation heating such as infrared radiation heating, ultrasonic heating, high frequency heating, and the like.

In case only a heating step is required without inducing a transfer step, the effective heating temperature ranges from about 50° C. to about 250° C., preferably from 80° C. to 180° C.

When the transfer of a mobile dye is combined with the process of the present invention, either a process of separately effecting developing and transfer steps or a process of simultaneously effecting developing and transfer steps as described in Japanese Patent Application Kokai No. 59-218443 may be effectively employed.

When a dye-providing substance which releases a mobile dye imagewise is used in the practice of the present invention, a dye transfer assistant may be used to transfer the dye from the photosensitive layer to the dye-fixing layer. The dye transfer assistants of the type supplied from outside the system include water and aqueous alkaline solutions containing sodium hydroxide, potassium hydroxide, or other inorganic alkali metal salts and organic bases. These bases may be those previously described in connection with the image formation promotor. Further, there may be used low boiling solvents such as methanol, N,N-dimethylformamide, acetone, diisobutyl ketone, etc., and mixtures of such a low boiling solvent with water or aqueous alkaline solution. The dye transfer assistant may be used by wetting the image receiving layer and/or photosensitive layer with the transfer assistant.

When the dye tranfer assistant has been incorporated into the heat-developable photosensitive material or dye-fixing material, the transfer assistant need not be supplied from the outside. The above-described dye transfer assistant may be incorporated into the material in the form of water of crystallization or microcapsules or as a precursor which releases a solvent at elevated temperatures. More preferably, a hydrophilic thermal solvent which is solid at an ambient temperature and melts at a high temperature may be incorporated into heat-developable photosensitive material or dye-fixing material. The hydrophilic thermal solvent may be incorporated in the heat-developable photosensitive material and/or the dye-fixing material. Although the solvent can be incorporated into any of the emulsion layer, intermediate layer, protective layer, and dye-fixing layer, it is preferred to incorporate it into the dye-fixing layer and/or layers adjacent thereto.

Examples of the hydrophilic thermal solvents include ureas, pyridines, amides, sulfonamides, imides, alcohols, oximes and other heterocyclic compounds.

In a process of simultaneously or continuously effecting development and transfer as detailed in Japanese Patent Application Kokai No. 59-218443, the aforementioned image formation promotor and/or dye transfer assistant may be previously contained in the dye-fixing material and/or light-sensitive material or supplied from the outside. This process of simultaneously or continuously effecting development and transfer preferably uses a heating temperature of at least 50° C., more preferably at least 60° C., but lower than the boiling point of the solvent used for transfer. For water used as the transfer solvent, temperatures between 60° C. and 100° C. are desirable.

When the developing and transfer steps are separately effected, the heating temperature ranges from about 50° C. to about 250° C., preferably from about 80° C. to about 180° C. To carry out transfer of a dye image, the heating temperature during the transfer step ranges from room temperature to the temperature used in the heat development step, and preferably from 50° C. to a temperature 10° C. lower than the heat development temperature.

The dye transfer assistant may be incorporated into the light-sensitive layer or dye-fixing layer by any well-known methods, for example, roller coating and wire bar applying methods as described in Japanese Patent Application Kokai No. 58-55907, application of water to the dye-fixing material using a water-absorbing member as described in Japanese Patent Application No. 58-55908, formation of a bead between the heat-developable light-sensitive material and the dye-fixing material to impart a dye transfer assistant as described in Japanese Patent Application No. 58-55906, and formation of a bead betaween a water-repellent roller and the dye-fixing layer to impart a dye transfer assistant as described in Japanese Patent Application No. 58-55910. Also applicable are dipping method, extrusion method, jet ejection through a fine port, pod-collapsing method, and many other known methods.

The dye transfer assistant may be added in a predetermined amount within a prescribed range as described in Japanese Patent Application No. 58-37902, or in an extra amount for subsequent adjustment such that an excess is subsequently squeezed out by applying a pressure by means of a roller or dried by heating. For example, a dye-fixing material is given a dye transfer assistant, typically water in an extra amount by any of the foregoing methods and then passed through compressing rollers to squeeze out the extra dye transfer assistant before it is overlaid on a light-sensitive material.

The pressure under which the heat-developable light-sensitive material is overlaid and closely adhered to the dye-fixing material generally ranges from 0.1 to 100 $kg/cm^2$, preferably from 1 to 50 $kg/cm^2$ although the exact pressure varies with the particular types of material used and contact process (see, inter alia, Japanese Patent Application No. 58-55691).

Application of pressure to an assembly of the heat-developable light-sensitive material and the dye-fixing material may be achieved by passing it through a pair of rollers, pressing it between fully smoothened flat platens, or any other well-known press means. During pressure application, the rollers or platens may be heated to a temperature from room temperature to the temperature used in the heat-development step.

BENEFITS OF THE INVENTION

According to the present process, an image is formed in an image forming reaction system comprising a difficultly soluble metal compound and a compound capable of water-mediated complexing reaction with the metal ion of the difficultly soluble metal compound and having an organic base, by reacting the two compounds in the presence of water to increase the pH of the system. The present process is thus successful in forming images having a high density, low fogging, and improved storage life while the operation involved is simple.

EXAMPLES

In order that those skilled in the art may better understand how the present invention may be practiced, the following examples are given by way of illustration and not by way of limitation.

EXAMPLE 1

Preparation of Silver Benzotriazole Emulsion

A silver benzotriazole emulsion was prepared as follows. Twenty eight (28) grams of gelatin and 13.2 grams of benzotriazole were dissolved in 300 ml of water. The resulting solution was agitated at 40° C. A solution of 17 grams silver nitrate in 100 ml water was added to the solution over a period of 2 minutes.

The resulting silver benzotriazole emulsion was adjusted to such pH that an excess salt precipitated, and the excess salt was filtered off. The emulsion was then adjusted to pH 6.30, obtaining a silver benzotriazole emulsion in a yield of 400 grams.

Preparation of Silver Halide Emulsion

A silver halide emulsion used in first and fifth layers was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.40 μm (bromine 50 mol %).

After rinsing with water and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

A silver halide emulsion used in a third layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.35 μm (bromine 80 mol %).

After water rinsing and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

Next, a dispersion of a dye-providing substance in gelatin was prepared as follows.

Preparation of Gelatin Dispersion of Dye-Providing Substance

Five (5) grams of yellow dye-providing substance (A) having the formula shown below was dissolved together with 0.5 grams of succinic acid-2-ethylhexyl ester sodium sulfonate and 10 grams of triisononyl phosphate in 30 ml of ethyl acetate by heating at about 60° C., obtaining a homogeneous solution. The solution was mixed with 100 grams of a 10 wt % lime-treated gelatin solution by agitation, and the mixture was dispersed with a homogenizer for 10 minutes at 10,000 rpm. This dispersion is called yellow dye-providing substance dispersion.

A magenta dye-providing substance dispersion was prepared by the same procedure as above except that a magenta dye-providing substance (B) was used as the dye-providing substance and 7.5 grams of tricresyl phosphate was used as the high boiling solvent.

A cyan dye-providing substance dispersion was prepared by the same procedure as above except that a cyan dye-providing substance (C) was used as the dye-providing substance.

Using these preparations, there was prepared a color light-sensitive material No. 101 of multi-layer structure as shown in the following formulation:

[FORMULATION]

Sixth layer
gelatin (coating weight 800 mg/m$^2$)
hardener*$^3$ (coating weight 16 mg/m$^2$)
silica*$^5$ (coating weight 100 mg/m$^2$)

Fifth layer:
Green-sensitive emulsion layer
silver chlorobromide emulsion (bromine 50 mol %, coating weight 400 mg/m$^2$ of Ag)
calcium carbonate (coating weight 500 mg/m$^2$)
silver benzotriazole emulsion (coating weight 100 mg/m$^2$ of Ag)
sensitizing dye D-1 (coating weight $10^{-6}$ mol/m$^2$)
hardener*$^3$ (coating weight 16 mg/m$^2$)
yellow dye-providing substance (A) (coating weight 400 mg/m$^2$)
gelatin (coating weight 1400 mg/m$^2$)
high-boiling solvent*$^4$ (coating weight 800 mg/m$^2$)
surface-active agent*$^2$ (coating weight 100 mg/m$^2$)

Fourth layer:
Intermediate layer
gelatin (coating weight 900 mg/m$^2$)
hardener*$^3$ (coating weight 18 mg/m$^2$)

Third layer:
Red-sensitive emulsion layer
silver chlorobromide emulsion (bromine 80 mol %, coating weight 300 mg/m$^2$ of Ag)
calcium carbonate (coating weight 500 mg/m$^2$)
silver benzotriazole emulsion (coating weight 100 mg/m$^2$ of Ag)
sensitizing dye D-2 (coating weight $8 \times 10^{-7}$ mol/m$^2$)
hardener*$^3$ (coating weight 18 mg/m$^2$)
magenta dye-providing substance (B) (coating weight 400 mg/m$^2$)
gelatin (coating weight 1400 mg/m$^2$)
high-boiling solvent*$^1$ (coating weight 600 mg/m$^2$)
surface-active agent*$^2$ (coating weight 100 mg/m$^2$)

Second layer:
Intermediate layer
gelatin (coating weight 800 mg/m$^2$)
hardener*$^3$ (coating weight 16 mg/m$^2$)

First layer:
Infrared-sensitive emulsion layer
silver chlorobromide emulsion (bromine 50 mol %, coating weight 300 mg/m$^2$ of Ag)
calcium carbonate (coating weight 500 mg/m$^2$)
silver benzotriazole emulsion (coating weight 100 mg/m$^2$ of Ag)
sensitizing dye D-3 (coating weight $10^{-8}$ mol/m$^2$)
hardener*$^3$ (coating weight 16 mg/m$^2$)
cyan dye-providing substance (C) (coating weight 300 mg/m$^2$)
gelatin (coating weight 1200 mg/m$^2$)
high-boiling solvent*$^4$ (coating weight 600 mg/m$^2$)
surface-active agent*$^2$ (coating weight 100 mg/m$^2$)
Support*$^6$

*$^1$tricresyl phosphate

*$^2$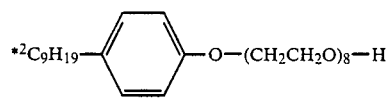

*$^3$1,2-bis(vinylsulfonylacetamide)ethane
*$^4$(iso-C$_9$H$_{19}$O)$_3$P=O
*$^5$size 4 μm
*$^6$polyethylene terephthalate, thickness 180 μm (A)

-continued
[FORMULATION]

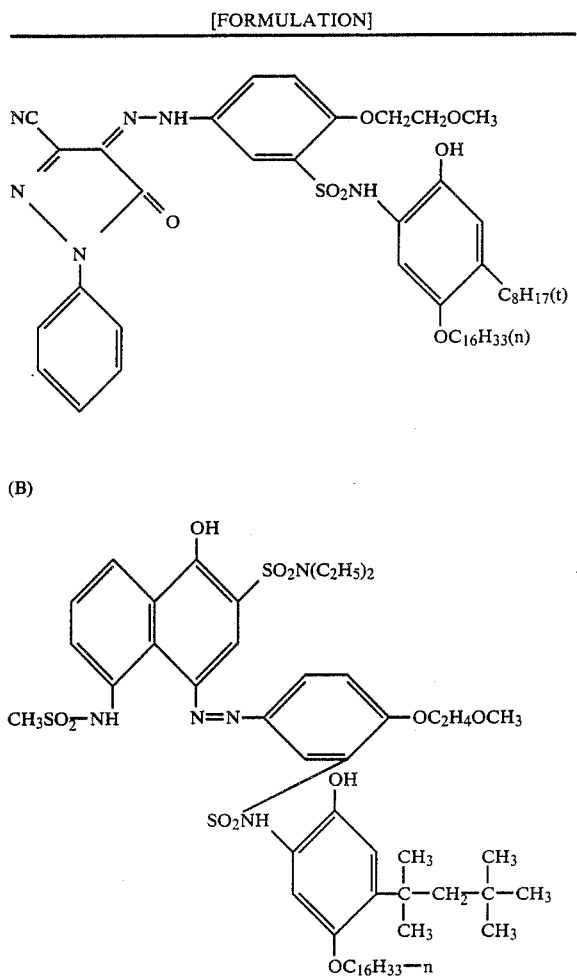

(B)

(C)

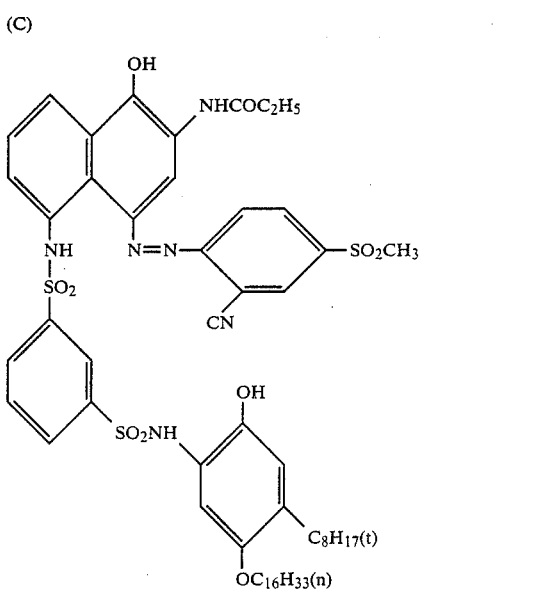

(D-1)

-continued
[FORMULATION]

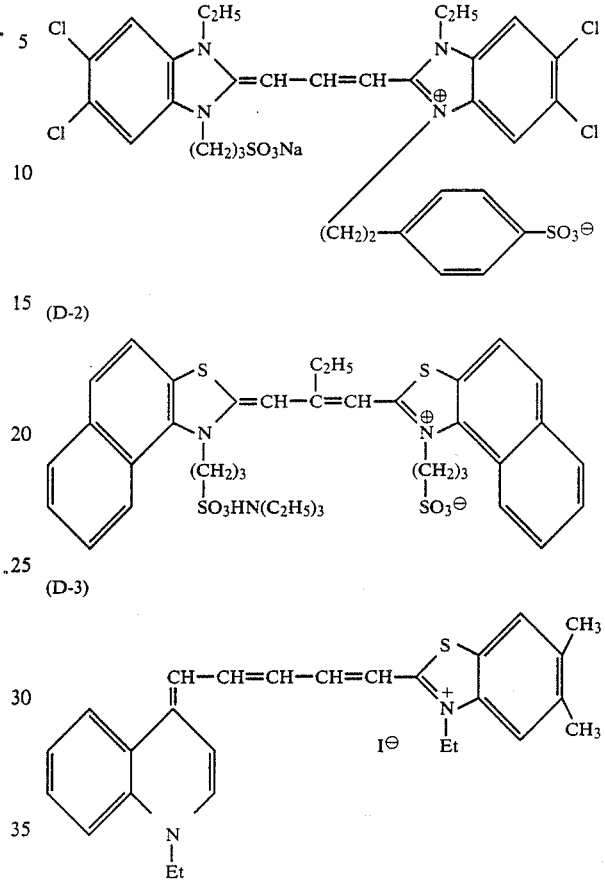

(D-2)

(D-3)

Next, the preparation of a dye-fixing material D-1 will be described.

Preparation of Dye-Fixing Material

Ten (10) grams of poly(methyl acrylate-co-N,N,N-trimethyl-N-vinylbenzylammonium chloride) having a molar ratio of methyl acrylate to vinylbenzyl ammonium chloride of 1:1 was dissolved in 175 ml of water, and the solution was homogeneously mixed with 100 grams of 10 wt % lime-treated gelatin. The resulting mixture was combined with 25 ml of an aqueous solution of 4% 2,4-dichloro-6-hydroxy-1,3,5-triazine and uniformly spread onto a paper substrate laminated with polyethylene having titanium dioxide dispersed therein, thereby forming a dye-fixing layer having a uniform wet thickness of 90 μm.

A solution obtained by mixing and dissolving 6 grams of guanidine oxalate, 18 ml of water, 20 grams of 10% gelatin, and 4.8 ml of an aqueous solution of 1% succinic acid-2-ethylhexyl ester sodium sulfonate was further coated thereon to a wet film thickness of 30 μm. After drying, there was obtained a dye-fixing material D-1 having a mordant layer.

Multilayered color light-sensitive material No. 101 was exposed for one second at 500 lux under a tungsten lamp through three color separation filters G, R, and IR having a continuously varying density. It should be noted that filter G is a 500–600 nm band pass filter, filter R is a 600–700 nm band pass filter, and filter IR is a filter transmitting light having wavelengths of at least 700 nm.

Water was applied by means of a wire bar in an amount of 20 ml per square meter to the emulsion surface of the thus exposed light-sensitive material No. 101, which was superimposed on the dye-fixing material D-1 such that their effective surfaces faced one another. After heating for 30 seconds through heat rollers at such a temperature that the temperature of the wet film reached 90° to 95° C., the dye-fixing material was peeled from the light-sensitive material. The dye-fixing material then bore thereon clear images of yellow (Y), magenta (M), and cyan (C) corresponding to the three color separation filters. The maximum density (Dmax) and minimum density (Dmin) of the respective color images were measured by means of a Macbeth (RD-519) reflection densitometer. The results are shown in Table 1.

In Comparative Example 1, light-sensitive material No. 102 was prepared by the same procedure as described for light-sensitive material No. 101 except that calcium carbonate was omitted.

Light-sensitive material No. 102 was processed in combination with dye-fixing material D-1 by the same procedure as described above. There was obtained no color images as reported in Table 1.

In Comparative Example 2, dye-fixing material D-2 was prepared by the same procedure as described for dye-fixing material D-1 except that guanidine oxalate was omitted.

Light-sensitive material No. 101 was processed in combination with dye-fixing material D-2 by the same procedure as described above. There was obtained no color images as reported in Table 1.

TABLE 1

| | Light-sensitive material | Dye-fixing material | Maximum density | | | Minimum density | | |
|---|---|---|---|---|---|---|---|---|
| | | | Y | M | C | Y | M | C |
| E1 | 101 | D-1 | 1.20 | 1.35 | 1.45 | 0.13 | 0.12 | 0.12 |
| CE1 | 102 | D-1 | 0.10 | 0.10 | 0.10 | 0.10 | 0.10 | 0.10 |
| CE2 | 101 | D-2 | 0.10 | 0.10 | 0.10 | 0.10 | 0.10 | 0.10 |

As evident from the data in Table 1, the combination of calcium carbonate with guanidine oxalate provides images having a high density and low fogging.

An aging test was performed by storing light-sensitive material No. 101 and dye-fixing material D-1 for 7 days at 40° C. and a relative humidity of 70% and processing them in the same manner as described above. For both maximum and minimum densities, the results showed no substantial difference from those in Table 1. It was demonstrated that the light-sensitive material and the dye-fixing material according to the present invention are improved in shelf storage.

EXAMPLE 2

The preparation of a dye-fixing material will be described.

Ten (10) grams of poly(methyl acrylate-co-N,N,N-trimethyl-N-vinylbenzylammonium chloride) having a molar ratio of methyl acrylate to vinylbenzyl ammonium chloride of 1:1 was dissolved in 175 ml of water, and the solution was homogeneously mixed with 100 grams of 10 wt % lime-treated gelatin. The resulting mixture was combined with 25 ml of an aqueous solution of 4% 2,4-dichloro-6-hydroxy-1,3,5-triazine and uniformly spread onto a paper substrate laminated with polyethylene having titanium dioxide dispersed therein, thereby forming a dye-fixing layer having a uniform wet thickness of 90 μm. After drying, there was obtained a dye-fixing material D-3 having a mordant layer.

Light-sensitive material No. 101 of Example 1 was exposed to light. Onto dye-fixing material D-3 prepared above, 20 ml/m² of a 20% solution of guanidine oxalate was coated by means of a wire bar. The coated dye-fixing material was superimposed on the exposed light-sensitive material such that their sensitive surfaces faced one another.

Thereafter, the same procedures as in Example 1 were repeated, obtaining the results.

| Color image | Maximum Density | Minimum density |
|---|---|---|
| Yellow | 1.25 | 0.14 |
| Magenta | 1.37 | 0.13 |
| Cyan | 1.44 | 0.13 |

As evident from these results, it introduces no observable difference in effect whether the complexing compound is incorporated in the dye-fixing material or supplied from the outside.

An aging test was performed by storing light-sensitive material No. 101 and dye-fixing material D-3 for 7 days at 40° C. and a relative humidity of 70% and processing them in the same manner as described above. For both maximum and minimum densities, the results showed no substantial difference from the above-reported data. It was demonstrated that the light-sensitive material and the dye-fixing material are improved in shelf storage.

EXAMPLE 3

Preparation of Silver Benzotriazole Emulsion Containing Light-Sensitive Silver Bromide A silver benzotriazole emulsion was prepared as follows. Ten (10) grams of gelatin and 6.5 grams of benzotriazole were dissolved in 1000 ml of water. The resulting solution was agitated at 50° C. A solution of 8.5 grams silver nitrate in 100 ml water was added to the solution over a period of 2 minutes.

A solution of 1.2 grams potassium bromide in 50 ml water was then added over a period of 2 minutes. The resulting silver benzotriazole emulsion was adjusted to such pH that an excess salt precipitated, and the excess salt was filtered off. The emulsion was then adjusted to pH 6.0, obtaining a silver benzotriazole emulsion in a yield of 200 grams.

Preparation of Gelatin Dispersion of Dye-Providing Substance

Ten (10) grams of dye-providing material having the formula:

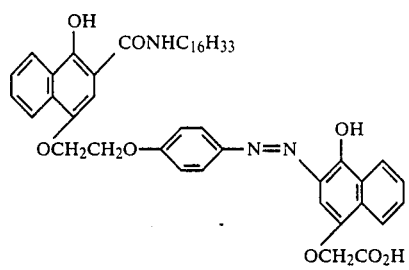

was dissolved together with 0.5 grams of succinic acid-2-ethylhexyl ester sodium sulfonate and 4 grams of tricresyl phosphate (TCP) in 20 ml of cyclohexanone by heating at about 60° C., obtaining a homogeneous solution. The solution was mixed with 100 grams of a 10 wt % lime-treated gelatin solution by agitation, and the mixture was dispersed with a homogenizer for 10 minutes at 10,000 rpm.

Preparation of light-Sensitive Coating Composition

A light-sensitive coating composition was prepared from the following formulation.

| Light-sensitive coating composition | |
|---|---|
| (a) Silver benzotriazole emulsion containing light-sensitive silver bromide | 10 g |
| (b) Dye-providing substance dispersion | 3.5 g |
| (c) Gelatin (10% aqueous solution) | 5 g |
| (d) 0.5 g developer precursor having the following formula in 5 ml methanol<br>HO—⟨Cl,Cl-phenyl⟩—NHCONHSO$_2$—⟨phenyl⟩—CH$_3$ | |
| (e) Aqueous solution of 10% compound having the formula:<br>C$_9$H$_{19}$—⟨phenyl⟩—O—(CH$_2$CH$_2$O)$_8$—H | 1 ml |
| (f) Calcium carbonate (10% aqueous dispersion) | 4.0 g |

Components (a) to (f) were mixed and dissolved by heating. The resulting coating solution was applied to a polyethylene terephthalate base film of 180 μm thick to a wet thickness of 30 μm.

Further, the following composition was coated thereon as a protective coating.

| Protective composition | |
|---|---|
| (g) 10% gelatin aqueous solution | 30 ml |
| (h) water | 60 ml |
| (i) Aqueous solution of 10 wt % 1,2-bis-(vinylsulfonylacetamide)ethane | 5 ml |

Components (g) to (i) were mixed. The protective composition was coated onto the light-sensitive coating to a wet thickness of 30 μm and then dried, obtaining a light-sensitive material.

The light-sensitive material thus prepared was imagewise exposed for ten seconds at 2000 lux under a tungsten lamp.

The exposed light-sensitive material was processed in combination with dye-fixing material D-1 used in Example 1 by the same procedure as in Example 1, obtaining the following results.

Maximum density: 1.50
Minimum density: 0.14

An aging test was performed by storing the light-sensitive material and dye-fixing material D-1 for 7 days at 40° C. and a relative humidity of 70% and processing them in the same manner as described above. For both maximum and minimum densities, the results showed no substantial difference from the above-reported data.

EXAMPLE 4

Preparation of Gelatin Dispersion of Dye-Providing Substance

Five (5) grams of a dye-releasing substance susceptible to reduction having the following formula, 4 grams of an electron-donative substance having the following formula, 0.5 grams of succinic acid-2-ethylhexyl ester sodium sulfonate, and 10 grams of tricresyl phosphate (TCP) were dissolved in 20 ml of cyclohexanone by heating at about 60° C., obtaining a homogeneous solution. The solution was mixed with 100 grams of a 10 wt % gelatin solution by agitation, and the mixture was dispersed with a homogenizer for 10 minutes at 10,000 rpm.

Dye-releasing substance susceptible to reduction:

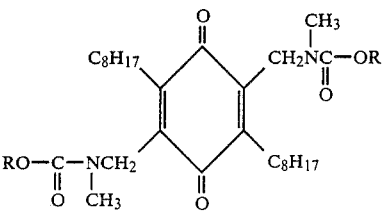

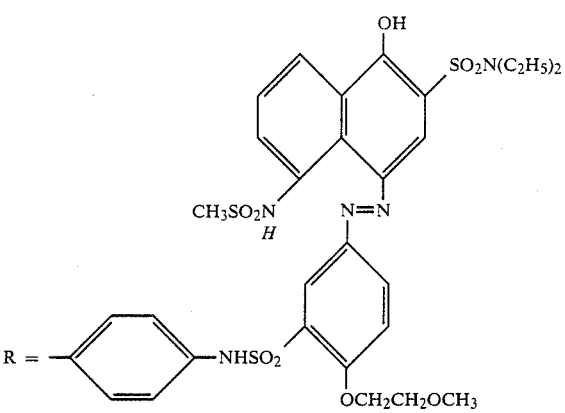

Electron-donative substance:

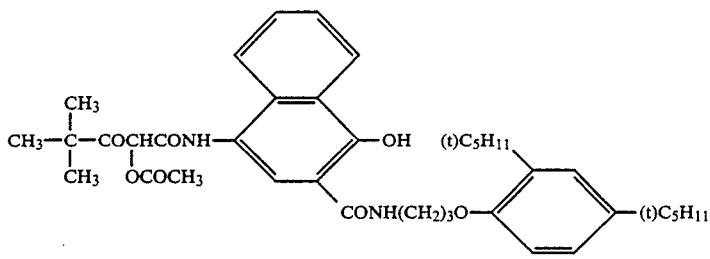

Preparation of Light-Sensitive Coating Composition

A light-sensitive coating composition was parepared from the following formulation.

| | Light-sensitive coating composition | |
|---|---|---|
| (a) | Silver benzotriazole emulsion containing light-sensitive silver bromide (as in Example 3) | 10 g |
| (b) | Dye-providing substance dispersion | 3.5 g |
| (c) | Aqueous solution of 5% compound having the formula: | 1.5 ml |
| | $C_9H_{19}$—⟨⟩—O—$(CH_2CH_2O)_8$—H | |
| (d) | Basic zinc carbonate (20% aqueous dispersion) | 3.0 g |

Components (a) to (d) were mixed and dissolved by heating. The resulting coating solution was applied to a polyethylene terephthalate base film to a wet thickness of 30 μm and dried.

Further, the following composition was coated thereon as a protective coating.

| Protective composition | |
|---|---|
| (g) 10% gelatin aqueous solution | 30 g |
| (h) water | 70 ml |
| (i) Aqueous solution of 2 wt % 1,2-bis-(vinylsulfonylacetamide)ethane | 5 ml |

Components (g) to (i) were mixed. The protective composition was coated onto the light-sensitive coating to a wet thickness of 30 μm and then dried, obtaining a light-sensitive material.

The light-sensitive material thus prepared was imagewise exposed for ten seconds at 2000 lux under a tungsten lamp.

A dye-fixing material D-4 was prepared by the same procedure as described for dye-fixing material D-1 in Example 1 except that the guanidine oxalate was replaced by 6 grams of guanidine picolinate.

The exposed light-sensitive material was processed in combination with dye-fixing material D-4 by the same procedure as in Example 1, obtaining the following results.

Maximum density: 1.90

Minimum density: 0.22

An aging test was performed by storing the light-sensitive material and dye-fixing material D-4 for 7 days at 40° C. and a relative humidity of 70% and processing them in the same manner as described above. For both maximum and minimum densities, the results showed no substantial difference from the above-reported data.

EXAMPLE 5

A light-sensitive material was prepared by coating a polyethylene terephthalate support film with the following layers in the indicated order.

(1) A layer containing silver benzotriazole (0.62 g/m² of Ag), red-sensitive silver iodobromide (1.42 g/m² of Ag), dye developer compound 5A (0.52 g/m²), gelatin (4.25 g/m²), auxiliary developer represented by structure W (0.11 g/m²), anti-fogging agent represented by structure X (0.20 g/m²), compound represented by structure Y (0.40 g/m²), compound represented by structure Z (0.95 g/m²), tricresyl phosphate (0.90 g/m²), and basic zinc carbonate (0.60 g/m²).

(2) A layer containing gelatin (1.2 g/m²)

(3) A layer containing silver benzotriazole (0.62 g/m² of Ag), green-sensitive silver iodobromide (1.14 g/m² of Ag), dye developer compound 5B (0.48 g/m²), gelatin (3.36 g/m²), auxiliary developer represented by structure W (0.11 g/m²), anti-fogging agent represented by structure X (0.20 g/m²), compound represented by structure Y (0.38 g/m²), compound represented by structure Z (0.72 g/m²), tricresyl phosphate (0.60 g/m²), and basic zinc carbonate (0.65 g/m²).

(4) A layer containing gelatin (1.6 g/m²).

(5) A layer containing silver benzotriazole (0.45 g/m² of Ag), blue-sensitive silver iodobromide (0.90 g/m² of Ag), dye developer compound 5C (0.28 g/m²), gelatin (2.85 g/m²), auxiliary developer represented by structure W (0.10 g/m²) anti-fogging agent represented by structure X (0.17 g/m²), thermal solvent represented by structure Y (0.36 g/m²), compound represented by structure Z (0.80 g/m²), tricresyl phosphate (0.50 g/m²), and basic zinc carbonate (0.60 g/m²)

(6) A layer containing gelatin (1.6 g/m²).

Dye developer compound 5A:

-continued
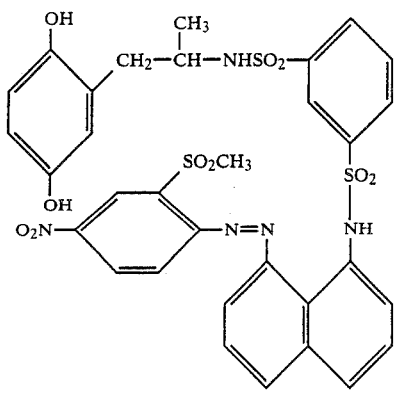
Dye developer compound 5B:
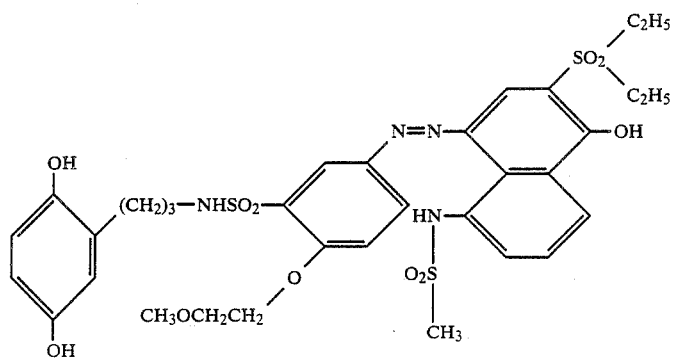
Dye developer compound 5C:
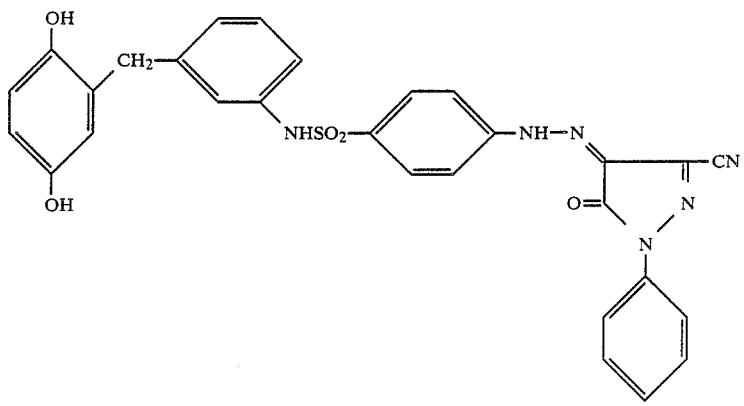
Auxiliary developer (Structure W)
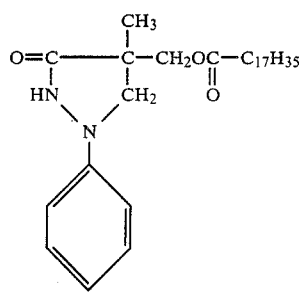
Anti-fogging agent (Structure X)
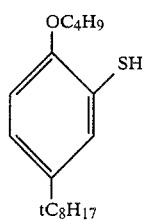

Surface-active agent (Structure Y)

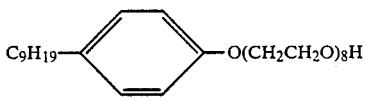

Compound (Structure Z)

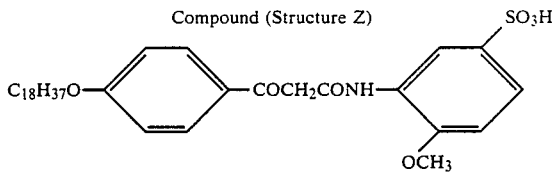

The multilayered color light-sensitive material E5 was exposed for one second at 2000 lux under a tungsten lamp through three color separation filters B, G, and R having a continuously varying density.

The exposed light-sensitive material was processed in combination with dye fixing material D-4 as used in Example 4 by the same procedure as in Example 1, obtaining the results as shown in Table 2.

TABLE 2

| Light-sensitive material | Dye-fixing material | Maximum density | | | Minimum density | | |
|---|---|---|---|---|---|---|---|
| | | Y | M | C | Y | M | C |
| E5 | D-4 | 1.42 | 1.45 | 1.59 | 0.46 | 0.45 | 0.46 |

An aging test was performed by storing light-sensitive material E5 and dye-fixing material D-4 for 7 days at 40° C. and a relative humidity of 70% and processing them in the same manner as described above. For both maximum and minimum densities, the results showed no substantial difference from those in Table 2. It was demonstrated that the method and materials according to the present invention produce clear images and improve shelf storage.

EXAMPLE 6

A silver halide emulsion used to form a first layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mols of silver nitrate in 600 ml of water were concurrently added to the gelatin solution at an equal flow rate over a period of 40 minutes. In this way, there was prepared a monodispersed cubic silver chlorobromide emulsion having an average grain size of 0.35 μm (bromine 80 mol %).

After water rinsing and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

A silver halide emulsion used to form a third layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide, another aqueous solution of 0.59 mols of silver nitrate in 600 ml of water, and a solution of 160 mg dye (I) shown below in 400 ml methanol were concurrently added to the gelatin solution at an equal flow rate over a period of 40 minutes. In this way, there was prepared a monodispersed cubic silver chlorobromide emulsion having an average grain size of 0.35 μm (bromine 80 mol%).

After water rinsing and desalting, 5 mg of sodium thiosulfate and 20 mg of 4-hydroxy-6-methyl-1,3,3a,7-tetraazaindene were added to effect chemical sensitization at 60° C. There was obtained an emulsion in a yield of 600 grams.

Dye (I):

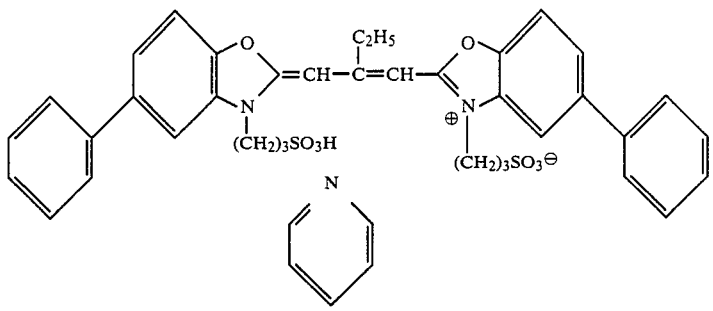

A silver halide emulsion used to form a fifth layer was prepared as follows.

An aqueous gelatin solution was prepared by dissolving 20 grams of gelatin and ammonia in 1000 ml of water and kept at a temperature of 50° C. With fully stirring, 1000 ml of an aqueous solution of potassium iodide and potassium bromide and another aqueous solution of 1 mol of silver nitrate in 1000 ml of water were concurrently added to the gelatin solution while maintaining pAg constant. In this way, there was prepared a monodispersed octahedral silver iodobromide emulsion having an average grain size of 0.5 μm (iodine 5 mol %).

After water rinsing and desalting, 5 mg of chloroauric acid (tetrahydrate) and 2 mg of sodium thiosulfate were added to effect gold and sulfur sensitization at 60° C. There was obtained an emulsion in a yield of 1000 grams.

A silver benzotriazole emulsion and a dispersion of a dye-providing substance in gelatin were prepared by the same procedures as in Example 1.

Using these preparations, there was prepared a color light-sensitive material E6 of multi-layer structure as shown in the following formulation:

[FORMULATION]

Sixth layer
gelatin (coating weight 800 mg/m²)
hardener*⁵ (coating weight 16 mg/m²)
basic zinc carbonate (coating weight 500 mg/m²)
Fifth layer:
Blue-sensitive emulsion layer
silver iodobromide emulsion (iodine 5 mol %, coating weight 400 mg/m² of Ag)
silver benzotriazole emulsion (coating weight 100 mg/m² of Ag)
hardener*⁵ (coating weight 16 mg/m²)
yellow dye-providing substance (A) (coating weight 400 mg/m²)
gelatin (coating weight 1200 mg/m²)
high-boiling solvent*⁴ (coating weight 800 mg/m²)
surface-active agent*² (coating weight 100 mg/m²)
Fourth layer:
Intermediate layer
gelatin (coating weight 900 mg/m²)
hardener*⁵ (coating weight 18 mg/m²)
basic zinc carbonate (coating weight 400 mg/m²)
Third layer:
Green-sensitive emulsion layer
silver chlorobromide emulsion (bromine 80 mol %, coating weight 300 mg/m² of Ag)
silver benzotriazole emulsion (coating weight 100 mg/m² of Ag)
hardener*⁵ (coating weight 18 mg/m²)
magenta dye-providing substance (B) (coating weight 400 mg/m²)
gelatin (coating weight 1200 mg/m²)
high-boiling solvent*¹ (coating weight 600 mg/m²)
surface-active agent*² (coating weight 100 mg/m²)
Second layer:
Intermediate layer
gelatin (coating weight 800 mg/m²)
hardener*⁵ (coating weight 16 mg/m²)
basic zinc carbonate (coating weight 450 mg/m²)
First layer:
Red-sensitive emulsion layer
silver chlorobromide emulsion (bromine 80 mol %, coating weight 300 mg/m² of Ag)
silver benzotriazole emulsion (coating weight 100 mg/m² of Ag)
sensitizing dye*³ (coating weight 8 × 10⁻⁷ mol/m²)
cyan dye-providing substance (C) (coating weight 300 mg/m²)
gelatin (coating weight 1000 mg/m²)
high-boiling solvent*⁴ (coating weight 450 mg/m²)
surface-active agent*² (coating weight 100 mg/m²)
hardener*⁵ (coating weight 16 mg/m²)
Support*⁶

*¹tricresyl phosphate

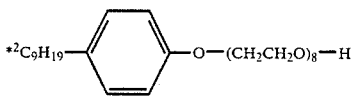

*³
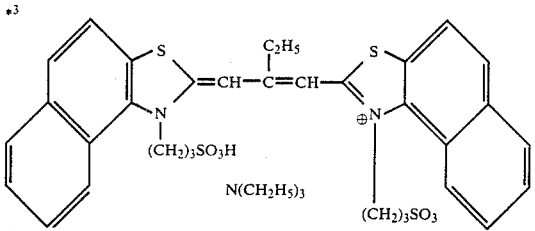

*⁴(iso-$C_9H_{19}O)_3P=O$
*⁵1,2-bis(vinylsulfonylacetamide)ethane
*⁶polyethylene terephthalate, thickness 180 μm The multilayered color light-sensitive material E6 was exposed for one second at 2000 lux under a tungsten lamp through three color separation filters B, G, and R having a continuously varying density.

Water was applied by means of a wire bar in an amount of 20 ml per square meter to the emulsion surface of the thus exposed ligh-sensitive material E6, which was superimposed on dye-fixing material D-4 as used in Example 4 such that their effective surfaces faced one another. The subsequent procedure followed that of Example 1, obtaining the following results.

| Three Color separation filter | Color image | Maximum density | Minimum density |
|---|---|---|---|
| B | Yellow | 1.92 | 0.13 |
| G | Magenta | 2.08 | 0.13 |
| R | Cyan | 2.11 | 0.12 |

An aging test was performed by storing light-sensitive material E6 and dye-fixing material D-4 for 7 days at 40° C. and a relative humidity of 70% and processing them in the same manner as described above. For both maximum and minimum densities, the results showed no substantial difference from the above-reported data.

EXAMPLE 7

A light-sensitive material E7 having the formulation indicated later was prepared from the same emulsion, dye-providing substance dispersion, and sensitizing dyes by the same procedures as used in Example 1 except that the silver benzotriazole emulsion was replaced by a silver acetylene emulsion prepared as described below and the calcium carbonate was replaced by basic zinc carbonate. A dye-fixing material D-5 was prepared by the same procedure as in Example 1 except that the guanidine oxalate was replaced by 6.0 grams of guanidine 5-ethylpyridine-2-carboxylate.

Preparation of Silver Acetylene Emulsion

In 1000 ml of water and 200 ml of ethanol were dissolved 20 grams of gelatin and 4.6 grams of 4-acetylaminophenylacetylene. The solution was agitated while maintaining at 40° C. To the solution was added 4.5 grams of silver nitrate in 200 ml of water over a period of 5 minutes. The dispersion was adjusted to such pH that an excess salt precipitated out. After removal of the salt precipitate, the dispersion was adjusted to pH 6.3. There was obtained a dispersion of the silver acetylene compound in a yield of 300 grams.

The same procedures and treatments as in Example 1 were repeated, with the following results.

| Color image | Maximum density | Minimum density |
|---|---|---|
| Yellow | 2.06 | 0.14 |
| Magenta | 2.36 | 0.14 |
| Cyan | 2.42 | 0.13 |

[FORMULATION]

Sixth layer
gelatin (coating weight 800 mg/m²)
hardener*³ (coating weight 16 mg/m²)
basic zinc carbonate (coating weight 500 mg/m²)
Fifth layer:
Green-sensitive emulsion layer
silver chlorobromide emulsion (bromine 50 mol %, coating weight 500 mg/m² of Ag)
silver acetylene emulsion (coating weight 100 mg/m² of -continued

| [FORMULATION] |
|---|
| Ag) |
| sensitizing dye D-1 (coating weight $10^{-6}$ mol/m$^2$) |
| hardener*$^3$ (coating weight 16 mg/m$^2$) |
| benzotriazole (coating weight 40 mg/m$^2$) |
| yellow dye-providing substance (A) (coating weight 400 mg/m$^2$) |
| gelatin (coating weight 1450 mg/m$^2$) |
| high-boiling solvent*$^4$ (coating weight 800 mg/m$^2$) |
| surface-active agent*$^2$ (coating weight 100 mg/m$^2$) |
| Fourth layer: |
| Intermediate layer |
| gelatin (coating weight 900 mg/m$^2$) |
| hardener*$^3$ (coating weight 18 mg/m$^2$) |
| basic zinc carbonate (coating weight 400 mg/m$^2$) |
| Third layer: |
| Red-sensitive emulsion layer |
| silver chlorobromide emulsion (bromine 80 mol %, coating weight 400 mg/m$^2$ of Ag) |
| silver acetylene emulsion (coating weight 100 mg/m$^2$ of Ag) |
| sensitizing dye D-2 (coating weight $8 \times 10^{-7}$ mol/m$^2$) |
| hardener*$^3$ (coating weight 18 mg/m$^2$) |
| benzotriazole (coating weight 30 mg/m$^2$) |
| magenta dye-providing substance (B) (coating weight 400 mg/m$^2$) |
| gelatin (coating weight 1450 mg/m$^2$) |
| high-boiling solvent*$^1$ (coating weight 600 mg/m$^2$) |
| surface-active agent*$^2$ (coating weight 100 mg/m$^2$) |
| Second layer: |
| Intermediate layer |
| gelatin (coating weight 800 mg/m$^2$) |
| hardener*$^3$ (coating weight 16 mg/m$^2$) |
| basic zinc carbonate (coating weight 450 mg/m$^2$) |
| First layer: |
| Infrared-sensitive emulsion layer |
| silver chlorobromide emulsion (bromine 50 mol %, coating weight 300 mg/m$^2$ of Ag) |
| silver acetylene emulsion (coating weight 80 mg/m$^2$ of Ag) |
| sensitizing dye D-3 (coating weight $10^{-8}$ mol/m$^2$) |
| hardener*$^3$ (coating weight 16 mg/m$^2$) |
| benzotriazole (coating weight 30 mg/m$^2$) |
| cyan dye-providing substance (C) (coating weight 300 mg/m$^2$) |
| gelatin (coating weight 1200 mg/m$^2$) |
| high-boiling solvent*$^4$ (coating weight 600 mg/m$^2$) |
| surface-active agent*$^2$ (coating weight 100 mg/m$^2$) |
| Support |

*$^1$tricresyl phosphate

*$^2$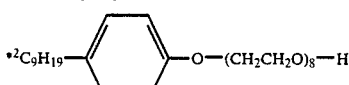

*$^3$1,2-bis(vinylsulfonylacetamide)ethane
*$^4$(iso-C$_9$H$_{19}$O)$_3$P=O

EXAMPLE 8

A dispersion of a dye-providing substance in gelatin was prepared as follows.

A homogeneous solution was prepared by weighing 15 grams of yellow dye-providing substance (A) as used in Example 1 and 7.5 grams of triisononyl phosphate, adding 40 ml of ethyl acetate thereto, and heating the mixture at 60° C. for dissolution. The solution was agitated and mixed with 100 grams of a 10% aqueous solution of lime-treated gelatin and 60 ml of a 2.5% aqueous solution of sodium dedecylbenzene sulfonate as a surface-active agent and the mixture dispersed by a homogenizer at 10,000 rpm for 10 minutes.

Using magenta and cyan dye-providing substances (B) and (C) as used in Example 1, gelatin dispersions of magenta and cyan dye-providing substances were also prepared by the same procedure as described for the yellow dye-providing substance dispersion.

A color light-sensitive material having a multi-layer structure of the following formulation was prepared using the emulsions used in Example 1 and the silver acetylene emulsion used in Example 7.

| [FORMULATION] |
|---|
| Sixth layer |
| gelatin (coating weight 800 mg/m$^2$) |
| hardener*$^3$ (coating weight 16 mg/m$^2$) |
| silica*$^5$ (coating weight 100 mg/m$^2$) |
| zinc hydroxide (coating weight 300 mg/m$^2$) |
| Fifth layer: |
| Green-sensitive emulsion layer |
| silver chlorobromide emulsion (bromine 50 mol %, coating weight 400 mg/m$^2$ of Ag) |
| silver acetylene emulsion (coating weight 60 mg/m$^2$ of Ag) |
| silver benzotriazole emulsion (coating weight 20 mg/m$^2$ of Ag) |
| sensitizing dye D-1 (coating weight $10^{-6}$ mol/m$^2$) |
| hardener*$^3$ (coating weight 16 mg/m$^2$) |
| yellow dye-providing substance (A) (coating weight 400 mg/m$^2$) |
| gelatin (coating weight 800 mg/m$^2$) |
| high-boiling solvent*$^4$ (coating weight 800 mg/m$^2$) |
| surface-active agent*$^2$ (coating weight 100 mg/m$^2$) |
| Fourth layer: |
| Intermediate layer |
| gelatin (coating weight 900 mg/m$^2$) |
| hardener*$^3$ (coating weight 18 mg/m$^2$) |
| zinc hydroxide (coating weight 300 mg/m$^2$) |
| Third layer: |
| Red-sensitive emulsion layer |
| silver chlorobromide emulsion (bromine 80 mol %, coating weight 300 mg/m$^2$ of Ag) |
| silver acetylene emulsion (coating weight 60 mg/m$^2$ of Ag) |
| silver benzotriazole emulsion (coating weight 20 mg/m$^2$ of Ag) |
| sensitizing dye D-2 (coating weight $8 \times 10^{-7}$ mol/m$^2$) |
| hardener*$^3$ (coating weight 18 mg/m$^2$) |
| magenta dye-providing substance (B) (coating weight 400 mg/m$^2$) |
| gelatin (coating weight 800 mg/m$^2$) |
| high-boiling solvent*$^4$ (coating weight 600 mg/m$^2$) |
| surface-active agent*$^2$ (coating weight 100 mg/m$^2$) |
| Second layer: |
| Intermediate layer |
| gelatin (coating weight 800 mg/m$^2$) |
| hardener*$^3$ (coating weight 16 mg/m$^2$) |
| zinc hydroxide (coating weight 300 mg/m$^2$) |
| First layer: |
| Infrared-sensitive emulsion layer |
| silver chlorobromide emulsion (bromine 50 mol %, coating weight 300 mg/m$^2$ of Ag) |
| silver acetylene emulsion (coating weight 25 mg/m$^2$ of Ag) |
| silver benzotriazole emulsion (coating weight 50 mg/m$^2$ of Ag) |
| sensitizing dye D-3 (coating weight $10^{-5}$ mol/m$^2$) |
| hardener*$^3$ (coating weight 16 mg/m$^2$) |
| cyan dye-providing substance (C) (coating weight 300 mg/m$^2$) |
| gelatin (coating weight 600 mg/m$^2$) |
| high-boiling solvent*$^4$ (coating weight 600 mg/m$^2$) |
| surface-active agent*$^2$ (coating weight 100 mg/m$^2$) |
| Support*$^1$ |

*$^1$polyethylene terephthalate, thickness 180 μm

*$^2$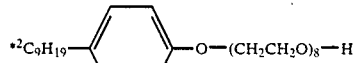

*$^3$1,2-bis(vinylsulfonylacetamide)ethane
*$^4$(iso-C$_9$H$_{19}$O)$_3$P=O
*$^5$size 4 μm A dye-fixing material was prepared as follows.

In 1300 ml of water were dissolved 63 grams of gelatin, 130 grams of a mordant having the structure shown below, and 100 grams (0.28 mols) of trisodium ethylenediaminetetraacetate. The solution was coated onto a polyethylene-laminated paper support to a wet film thickness of 45 μm and then dried.

Mordant:

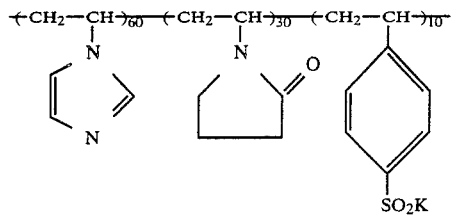

A solution of 35 grams of gelain and 1.05 grams of 1,2-(vinylsulfonylacetamide)ethane in 800 ml of water was coated on the mordant layer to a wet film thickness of 17 μm and then dried, obtaining a dye-fixing material D-6.

In addition, dye-fixing materials D-7 to D-9 were prepared by the same procedure as described for D-6 except that 100 grams of trisodium ethylenediaminetetraacetate was replaced by amounts of the compounds as indicated in Table 3.

Multilayered color light-sensitive material E8 was exposed for one second at 500 lux under a tungsten lamp through three color separation filters G, R, and IR having a continuously varying density. It should be noted that filter G is a 500–600 nm band pass filter, filter R is a 600–700 nm band pass filter, and filter IR is a filter transmitting light having wavelengths of at least 700 nm.

Water was applied by means of a wire bar in an amount of 13 ml per square meter to the emulsion surface of the thus exposed light-sensitive material E8, which was superimposed on each of dye-fixing materials D-6 to D-9 such that their effective surfaces faced one another. After heating for 25 seconds through heat rollers at such a temperature that the temperature of the wet film reached 90° to 95° C., the dye-fixing material was peeled from the light-sensitive material. The dye-fixing material then bore thereon clear images of yellow (Y), magenta (M), and cyan (C) corresponding to the three color separation filters G, R, and IR. The maximum density (Dmax) and minimum density (Dmin) of the respective color images were measured by means of a Macbeth (RD-519) reflection densitometer. The results are shown in Table 3.

TABLE 3

| Dye-fixing material | | |
|---|---|---|
| No. | Complexing compound | Amount |
| D-6* | trisodium ethylenediaminetetraacetate | 0.28 mol |
| D-7 | triguanidine ethylenediaminetetraacetate | 0.28 mol |
| D-8* | tripotassium citrate | 0.28 mol |
| D-9 | tri(tetramethylguanidine) citrate | 0.28 mol |

| | Maximum density | | | Minimum density | | |
|---|---|---|---|---|---|---|
| No. | Y | M | C | Y | M | C |
| D-6* | 0.72 | 0.84 | 0.65 | 0.08 | 0.10 | 0.08 |
| D-7 | 1.92 | 1.98 | 2.35 | 0.12 | 0.14 | 0.14 |
| D-8* | 0.07 | 0.07 | 0.07 | 0.07 | 0.07 | 0.07 |
| D-9 | 1.30 | 1.00 | 1.03 | 0.08 | 0.08 | 0.08 |

*comparison

Although U.S. Pat. No. 3,260,598 discloses a method for forming a base using a combination of $Zn(OH)_2$ with trisodium ehtylenediaminetetraacetate or tripotassium citrate, it is evident from Table 3 that the use of the alkali metal salts disclosed in said patent as the complexing compound results in color images having a very low density.

The foregoing examples demonstrate the improved results of the present invention.

We claim:

1. A process for forming an image in an image forming reaction system, which comprises imagewise exposure followed by image developement, said system comprising a light-sensitive material and a difficulty soluble metal compound and a compound capable of water-mediated complexing reaction with the metal component in ionic form of said difficulty soluble metal compound an having an organic base, wherein said two compounds are reacted in the presence of water to increase the pH of the system.

2. An image forming process according to claim 1 wherein said system further comprises a photographic heat-developapble silver halide light-sensitive material.

3. An image forming process according to claim 1 wherein said difficultly soluble metal compound is selected from the group consisting of carbonate salts, phosphate salts, silicate salts, borate salts, aluminate salts, hydroxides, oxides, and double salts thereof, provided that they have a solubility in water at 20° C. of 0.5 or less as expressed in grams of the compound dissolved in 100 grams of water.

4. An image forming process according to claim 1 wherein said complexing compound is selected from aromatic heterocyclic compounds having at least one —COOHM and containing one nitrogen atom in their ring wherein M is an organic base.

5. An image forming process according to claim 4 wherein the aromatic heterocyclic compound contains a pyridine or quinoline ring.

6. An image forming process according to claim 4 wherein —COOHM is attached to the ring at the α-position thereof relative to the N atom.

7. An image forming process according to claim 1 wherein said complexing compound is selected from compounds having the general formula:

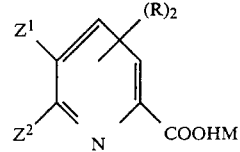

wherein
R represents an electron donative radical selected from the group consisting of hydrogen atom, aryl radicals, halogen atoms, alkoxy radicals, -COOM, hydroxycarbonyl radical, amino and substituted amino radicals, and alkyl radicals, the two R's may be the same or different, $Z^1$ and $Z^2$ are as defined for R and may be combined together to form a ring fused to the pyridine ring, and M is an organic base.

8. An image forming process according to claim 1 wherein the difficultly soluble metal compound and the complexing compound are independently contained in at least one layer on separate supports.

9. An image forming process according to claim 1 wherein the difficultly soluble metal compound is contained in a light-sensitive material and the complexing compound contained in an image-receiving material.

10. An image forming process according to claim 1 wherein each of the difficultly soluble metal compound and the complexing compound is used in an amount of up to 50% by weight based on the weight of a coating containing the compound.

11. An image forming process according to claim 10 wherein each of the difficultly soluble metal compound and the complexing compound is used in an amount of 0.01 to 40% by weight based on the weight of a coating containing the compound.

12. An image forming process according to claim 1 wherein the system contains a silver halide as the light-sensitive material.

13. An image forming process according to claim 2 wherein a diffusible dye produced at sites corresponding or counter-corresponding to silver images is transferred to an image-receiving layer at the same time as development by heating in the presence of a small amount of water after imagewise exposure or simultaneously with imagewise exposure.

14. An image forming process according to claim 9 wherein water is supplied in an amount ranging from one tenth of the weight of overall coatings of the light-sensitive and image-receiving materials to the weight of solvent corresponding to the maximum swollen volume of the overall coatings.

15. An image forming process according to claim 14 wherein water is supplied in an amount of 1 to 50 grams per square meter of the combined surfaces of the light-sensitive material and image-receiving material.

* * * * *

UNITED STATES PATENT AND TRADEMARK OFFICE
CERTIFICATE OF CORRECTION

PATENT NO. : 4,740,445

DATED : April 26, 1988

INVENTOR(S) : HIRAI et al

It is certified that error appears in the above-identified patent and that said Letters Patent is hereby corrected as shown below:

COLUMN 48, LINE 16  After "compound" delete "an" and insert --and--.

Signed and Sealed this

Thirteenth Day of December, 1988

Attest:

DONALD J. QUIGG

Attesting Officer

Commissioner of Patents and Trademarks